(12) United States Patent
Choi et al.

(10) Patent No.: US 10,305,557 B2
(45) Date of Patent: May 28, 2019

(54) CODEBOOK FOR MULTIPLE-INPUT MULTIPLE-OUTPUT SYSTEM AND COMMUNICATION METHOD AND APPARATUS USING SAME

(71) Applicants: Samsung Electronics Co., Ltd., Suwon-si, Gyeonggi-do (KR); Purdue Research Foundation, West Lafayette, IN (US)

(72) Inventors: Junil Choi, Seoul (KR); David J. Love, West Lafayette, IN (US); Tae-Young Kim, Seongnam-si (KR); Ji-Yun Seol, Seongnam-si (KR)

(73) Assignees: Samsung Electronics Co., Ltd., Suwon-si (KR); Purdue Research Foundation, West Lafayette, IN (US)

( * ) Notice: Subject to any disclaimer, the term of this patent is extended or adjusted under 35 U.S.C. 154(b) by 309 days.

(21) Appl. No.: 15/106,644

(22) PCT Filed: Dec. 22, 2014

(86) PCT No.: PCT/KR2014/012666
§ 371 (c)(1),
(2) Date: Jun. 20, 2016

(87) PCT Pub. No.: WO2015/093918
PCT Pub. Date: Jun. 25, 2015

(65) Prior Publication Data
US 2018/0198500 A1    Jul. 12, 2018

Related U.S. Application Data

(60) Provisional application No. 61/919,122, filed on Dec. 20, 2013.

(30) Foreign Application Priority Data

Dec. 22, 2014    (KR) .................. 10-2014-0186023

(51) Int. Cl.
H04B 7/04       (2017.01)
H04B 7/0456     (2017.01)
(Continued)

(52) U.S. Cl.
CPC ......... *H04B 7/0478* (2013.01); *H04B 7/0417* (2013.01); *H04L 1/006* (2013.01)

(58) Field of Classification Search
CPC .. H04B 7/0413; H04B 7/0417; H04B 7/0619; H04B 7/0626; H04B 7/0673; H04L 1/006
See application file for complete search history.

(56) References Cited

U.S. PATENT DOCUMENTS

2007/0233473 A1    10/2007    Lee et al.
2007/0297529 A1    12/2007    Zhou et al.
(Continued)

FOREIGN PATENT DOCUMENTS

WO    2010088092 A1    8/2010

OTHER PUBLICATIONS

Daniel J. Ryan, et al. "QAM and PSK codebooks for limited feedback MIMO beamforming", pp. 1184-1196, Apr. 4, 2009.
(Continued)

*Primary Examiner* — David S Huang
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). Exemplary embodiment of the present invention provide a scheme for reducing feedback overhead when quantizing and feeding back channel state information in a MIMO system. A method for operating a receiver in a MIMO system, according to one embodiment of the present invention, includes the steps of: performing trellis coded quantization for channel
(Continued)

information by using a codebook selected from a plurality of codebooks; and transmitting, to a transmitter, feedback information including the quantization result. The step of performing trellis-coded quantization for the channel information includes a step of truncating the channel information and codewords included in the selected codebook into multiple groups of channel vectors and multiple groups of codewords, respectively, and performing trellis-coded quantization for each of the groups of the channel vectors by using each of the groups of the codewords.

20 Claims, 29 Drawing Sheets

(51) Int. Cl.
   *H04B 7/0417* (2017.01)
   *H04L 1/00* (2006.01)

(56) References Cited

U.S. PATENT DOCUMENTS

| | | | |
|---|---|---|---|
| 2008/0108310 A1* | 5/2008 | Tong | H04B 7/016 455/69 |
| 2009/0067512 A1 | 3/2009 | Mielczarek et al. | |
| 2011/0135020 A1 | 6/2011 | Au-Yeung et al. | |
| 2012/0183020 A1 | 7/2012 | Koike-Akino et al. | |
| 2015/0023440 A1* | 1/2015 | Suh | H04L 1/006 375/267 |

OTHER PUBLICATIONS

Junil Choi et al., "Noncoherent trellis-coded quantization for massive MIMO limited feedback beamforming".

Junil Choi et al., "Limited feedback in massive MIMO systems—exploiting channel correlations via noncoherent trellis-coded quantization", 2013.

Junil Choi et al., "Noncoherent Trellis Coded Quantization A Practical Limited Feedback Technique for Massive MIMO Systems", Nov. 8, 2013.

Wim Sweldens, "Fast block noncoherent decoding", Apr. 4, 2001.

Daniel J. Ryan, et al. "GLRT—optimal noncoherent lattice decoding", Jul. 7, 2007.

Michael W. Marcellin, et al. "Trellis Coded Quantization of Memoryless and Gauss-Markov Sources", pp. 82-93, Jan. 1, 1990.

Chun Kin Au-Yeung, et al. "Trellis Coded Line Packing—Large Dimensional Beamforming Vector Quantization and Feedback Transmission", pp. 1844-1853, Jun. 6, 2011.

"Evolved Universal Terrestrial Radio Access (E-UTRA); Physical Channels and Modulation (Release 11)", Oct. 2012.

* cited by examiner

| Codebook index | $u_n$ | Number of layers $v$ | | | |
|---|---|---|---|---|---|
| | | 1 | 2 | 3 | 4 |
| 0 | $u_0 = [1\ -1\ -1\ -1]$ | $W_0^{(1)}$ | $W_0^{(14)}/\sqrt{2}$ | $W_0^{(124)}/\sqrt{2}$ | $W_0^{(1234)}/2$ |
| 1 | $u_1 = [1\ -j\ 1\ j]$ | $W_1^{(1)}$ | $W_1^{(12)}/\sqrt{2}$ | $W_1^{(123)}/\sqrt{2}$ | $W_1^{(1234)}/2$ |
| 2 | $u_2 = [1\ 1\ -1\ 1]$ | $W_2^{(1)}$ | $W_2^{(12)}/\sqrt{2}$ | $W_2^{(123)}/\sqrt{2}$ | $W_2^{(1214)}/2$ |
| 3 | $u_3 = [1\ j\ 1\ -j]$ | $W_3^{(1)}$ | $W_3^{(12)}/\sqrt{2}$ | $W_3^{(123)}/\sqrt{2}$ | $W_3^{(1234)}/2$ |
| 4 | $u_4 = [1\ (-1-j)/\sqrt{2}\ -j\ (1-j)/\sqrt{2}]$ | $W_4^{(1)}$ | $W_4^{(14)}/\sqrt{2}$ | $W_4^{(124)}/\sqrt{2}$ | $W_4^{(1234)}/2$ |
| 5 | $u_5 = [1\ (1-j)/\sqrt{2}\ j\ (-1-j)/\sqrt{2}]$ | $W_5^{(1)}$ | $W_5^{(14)}/\sqrt{2}$ | $W_5^{(124)}/\sqrt{2}$ | $W_5^{(1234)}/2$ |
| 6 | $u_6 = [1\ (1+j)/\sqrt{2}\ -j\ (-1+j)/\sqrt{2}]$ | $W_6^{(1)}$ | $W_6^{(13)}/\sqrt{2}$ | $W_6^{(134)}/\sqrt{2}$ | $W_6^{(1234)}/2$ |
| 7 | $u_7 = [1\ (-1+j)/\sqrt{2}\ j\ (1+j)/\sqrt{2}]$ | $W_7^{(1)}$ | $W_7^{(13)}/\sqrt{2}$ | $W_7^{(134)}/\sqrt{2}$ | $W_7^{(1234)}/2$ |
| 8 | $u_8 = [1\ -1\ 1\ 1]$ | $W_8^{(1)}$ | $W_8^{(12)}/\sqrt{2}$ | $W_8^{(124)}/\sqrt{2}$ | $W_8^{(1234)}/2$ |
| 9 | $u_9 = [1\ -j\ -1\ -j]$ | $W_9^{(1)}$ | $W_9^{(14)}/\sqrt{2}$ | $W_9^{(134)}/\sqrt{2}$ | $W_9^{(1234)}/2$ |
| 10 | $u_{10} = [1\ 1\ 1\ -1]$ | $W_{10}^{(1)}$ | $W_{10}^{(13)}/\sqrt{2}$ | $W_{10}^{(123)}/\sqrt{2}$ | $W_{10}^{(1234)}/2$ |
| 11 | $u_{11} = [1\ j\ -1\ j]$ | $W_{11}^{(1)}$ | $W_{11}^{(13)}/\sqrt{2}$ | $W_{11}^{(134)}/\sqrt{2}$ | $W_{11}^{(1234)}/2$ |
| 12 | $u_{12} = [1\ -1\ -1\ 1]$ | $W_{12}^{(1)}$ | $W_{12}^{(12)}/\sqrt{2}$ | $W_{12}^{(123)}/\sqrt{2}$ | $W_{12}^{(1234)}/2$ |
| 13 | $u_{13} = [1\ -1\ 1\ -1]$ | $W_{13}^{(1)}$ | $W_{13}^{(13)}/\sqrt{2}$ | $W_{13}^{(123)}/\sqrt{2}$ | $W_{13}^{(1324)}/2$ |
| 14 | $u_{14} = [1\ 1\ -1\ -1]$ | $W_{14}^{(1)}$ | $W_{14}^{(13)}/\sqrt{2}$ | $W_{14}^{(123)}/\sqrt{2}$ | $W_{14}^{(3214)}/2$ |
| 15 | $u_{15} = [1\ 1\ 1\ 1]$ | $W_{15}^{(1)}$ | $W_{15}^{(12)}/\sqrt{2}$ | $W_{15}^{(123)}/\sqrt{2}$ | $W_{15}^{(1234)}/2$ |

FIG.9

|  | Trellis output index | 0 | 2 | 4 | 6 | 8 | 10 | 12 | 14 |
|---|---|---|---|---|---|---|---|---|---|
| $C_{even}$ | LTE codeword index | 0 | 4 | 2 | 6 | 1 | 5 | 3 | 7 |
| $C_{odd}$ | Trellis output index | 1 | 3 | 5 | 7 | 9 | 11 | 13 | 15 |
|  | LTE codeword index | 8 | 12 | 10 | 14 | 9 | 13 | 11 | 15 |

FIG. 10C

| $C_{even}$ | Trellis output index | 0 | 2 | 4 | 6 |
|---|---|---|---|---|---|
| | LTE codeword index | 0 | 1 | 2 | 3 |
| $C_{odd}$ | Trellis output index | 1 | 3 | 5 | 7 |
| | LTE codeword index | 4 | 5 | 6 | 7 |

FIG.11C $$h = \begin{bmatrix} 0.3802 - 0.0878\,i \\ 1.2968 + 1.0534\,i \\ -1.5972 + 0.9963\,i \\ 0.6096 + 1.0021\,i \\ 0.2254 + 0.4748\,i \\ -0.9247 - 0.8538\,i \\ -0.3066 + 0.5072\,i \\ 0.2423 + 1.1528\,i \\ 2.5303 + 0.3457\,i \\ 1.9583 + 0.7316\,i \\ -0.9545 + 0.5140\,i \\ 2.1460 - 0.2146\,i \\ 0.5129 + 0.2078\,i \\ -0.0446 - 0.5567\,i \\ 0.5054 + 0.6282\,i \\ -0.1449 - 0.8111\,i \end{bmatrix} \begin{matrix} \}\,1201\;\;L=1 \\ \\ \}\,1202\;\;L=2 \\ \\ \}\,1203\;\;L=3 \\ \\ \}\,1204\;\;L=4 \\ \end{matrix}$$

M = 16

FIG.12A $$\hat{h} = \begin{bmatrix} w_1^{\{1\}} \\ w_3^{\{1\}} \\ w_0^{\{1\}} \\ w_6^{\{1\}} \end{bmatrix} = \begin{bmatrix} 0.5000 \\ 0 + 0.5000\ i \\ -0.5000 \\ 0 - 0.5000\ i \\ 0.5000 \\ 0 - 0.5000\ i \\ -0.5000 \\ 0 + 0.5000\ i \\ 0.5000 \\ 0.5000 \\ 0.5000 \\ 0.5000 \\ 0.5000 \\ -0.3536 - 0.3536\ i \\ 0 + 0.5000\ i \\ 0.3536 - 0.3536\ i \end{bmatrix}$$

FIG.12B $\hat{h}_0 = [\hat{h}_{0,1}, \hat{h}_{0,2}, \hat{h}_{0,3}, \hat{h}_{0,4} \mid \hat{h}_{0,5}, \hat{h}_{0,6}, \hat{h}_{0,7}, \hat{h}_{0,8} \mid \hat{h}_{0,9}, \hat{h}_{0,10}, \hat{h}_{0,11}, \hat{h}_{0,12}]$ $\times e^{j\varphi_{0,1}}$ , $\times e^{j\varphi_{0,2}}$ , $\times e^{j\varphi_{0,3}}$

⇩

$\hat{h}_1 = [\hat{h}_{1,1}, \hat{h}_{1,2} \mid \hat{h}_{1,3}, \hat{h}_{1,4}, \hat{h}_{1,5}, \hat{h}_{1,6} \mid \hat{h}_{1,7}, \hat{h}_{1,8}, \hat{h}_{1,9}, \hat{h}_{1,10} \mid \hat{h}_{0,11}, \hat{h}_{0,12}]$ $\times e^{j\varphi_{1,3}}$ , $\times e^{j\varphi_{1,1}}$ , $\times e^{j\varphi_{1,2}}$ , $\times e^{j\varphi_{1,3}}$

⇩

$\hat{h}_2 = [\hat{h}_{2,1}, \hat{h}_{2,2}, \hat{h}_{2,3}, \hat{h}_{2,4} \mid \hat{h}_{2,5}, \hat{h}_{2,6}, \hat{h}_{2,7}, \hat{h}_{2,8} \mid \hat{h}_{2,9}, \hat{h}_{2,10}, \hat{h}_{2,11}, \hat{h}_{2,12}]$ $\times e^{j\varphi_{2,3}}$ , $\times e^{j\varphi_{2,1}}$ , $\times e^{j\varphi_{2,2}}$

| $C_{even}$ | Trellis output index | 0 | 2 | 4 | 6 |
|---|---|---|---|---|---|
| | Phase for φ | 0 | 2/8π | 4/8π | 6/8π |
| $C_{odd}$ | Trellis output index | 1 | 3 | 5 | 7 |
| | Phase for φ | 1/8π | 3/8π | 5/8π | 7/8π |

FIG.18

| $C_{even}$ | Trellis output index | 0 | 2 |
|---|---|---|---|
| | Phase for φ | 0 | 2/4π |
| $C_{odd}$ | Trellis output index | 1 | 3 |
| | Phase for φ | 1/4π | 3/4π |

FIG.19C

| | FB overhead | Rayleigh | DP 0.5λ, 8AS | DP 4λ, 15AS | ULA 0.5λ, 8AS | ULA 4λ, 15AS |
|---|---|---|---|---|---|---|
| TE | 4 bits | 3.0191 | 4.4754 | 3.586 | 4.6944 | 3.5668 |
| | 6 bits | 3.6797 | 5.2534 | 4.3172 | 4.9485 | 4.1556 |
| LTE-Advanced | 6 bits | 3.5556 | 7.2346 | 4.559 | 6.9375 | 4.3595 |

FIG. 20

CODEBOOK FOR MULTIPLE-INPUT MULTIPLE-OUTPUT SYSTEM AND COMMUNICATION METHOD AND APPARATUS USING SAME

TECHNICAL FIELD

The present disclosure relates to a codebook to be used in a wireless communication system and communication using the same.

BACKGROUND ART

To meet the demand for wireless data traffic having increased since deployment of 4th generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The concept of addition of a plurality of transmission antennas, which is frequently called a huge or large scale MIMO system, has drawn attention from the industrial world and the academic world over the years. To easily obtain a beamforming gain and/or a spatial multiplexing gain in the large scale MIMO system, channel state information (CSI) between a transmitter and a receiver is essential for the transmitter. Time division duplexing (TDD) assumes that the transmitter in the large scale MIMO system depends on the channel reciprocity to have CSI without transmitting a pilot and estimating/feeding back a channel. However, an effective approach method for acquiring CSI in the large scale MIMO system has been discussed since most of the cellular systems adopted frequency division duplexing (FDD).

DETAILED DESCRIPTION OF THE INVENTION

Technical Objects

Accordingly, exemplary embodiments of the present disclosure provide a method and an apparatus for quantizing channel state information in a multiple-input multiple-out (MIMO) system.

Exemplary embodiments of the present disclosure provide a method and an apparatus for reducing feedback overhead when a receiver in a MIMO system quantizes channel state information and feeds back the channel state information to a transmitter.

Exemplary embodiments of the present disclosure provide a method and an apparatus for trellis-coded quantizing channel state information and feeding back the channel state information to a transmitter at a receiver in a MIMO system.

Exemplary embodiments of the present disclosure provide a method and an apparatus for generating a trellis-extended codebook to be used to quantize channel state information at a receiver in a MIMO system.

Exemplary embodiments of the present disclosure provide a method and an apparatus for quantizing channel state information using a trellis-extended codebook at a receiver in a MIMO system, and phase-adjusting the result of the quantizing and feeding back the result of the phase-adjusting to a transmitter.

Exemplary embodiments of the present disclosure provide a method and an apparatus for receiving trellis-coded quantized information which is fed back from a receiver at a transmitter in a MIMO system, and reconfiguring channel information.

Exemplary embodiments of the present disclosure provide a method and an apparatus for receiving trellis-coded quantized and phase-adjusted information which is fed back from a receiver at a transmitter in a MIMO system, and reconfiguring channel information.

Technical Solving Means

According to an exemplary embodiment of the present disclosure, a method for operating of a receiver in a multiple-input multiple-out (MIMO) system includes: trellis-coded quantizing channel information using a codebook selected from a plurality of codebooks; and a process of transmitting, to a transmitter, feedback information including a result of the quantizing. The process of trellis-coded quantizing the channel information includes: a process of truncating the channel information and codewords included in the selected codebook into a plurality of groups of channel vectors and a plurality of groups of codewords; and a process of trellis-coded quantizing each of the groups of the channel vectors using each of the groups of the codewords.

According to another exemplary embodiment of the present disclosure, a method for operating of a transmitter in a MIMO system includes: a process of receiving, from a receiver, feedback information including a result of trellis-coded quantizing. The feedback information is generated by trellis-coded quantizing, by the receiver, channel information using a codebook selected from a plurality of codebooks. The process of trellis-coded quantizing includes a process of truncating the channel information and codewords included in the selected codebook into a plurality of groups of channel vectors and a plurality of groups of codewords, and a process of trellis-coded quantizing each of the groups of the channel vectors using each of the groups of the codewords.

According to another exemplary embodiment of the present disclosure, a receiver in a MIMO system includes: a trellis-coded quantizer configured to trellis-coded quantize channel information using a codebook selected from a plurality of codebooks; a feedback information generator configured to generate feedback information including a result of the quantizing; and a transmission unit configured to transmit the feedback information to a transmitter. The trellis-coded quantizer is configured to truncate the channel information and codewords included in the selected codebook into a plurality of groups of channel vectors and a plurality of groups of codewords, and trellis-coded quantize each of the groups of the channel vectors using each of the groups of the codewords.

According to another exemplary embodiment of the present disclosure, A transmitter in a MIMO system includes a reception unit configured to receive, from a receiver, feedback information including a result of trellis-coded quantizing. The feedback information may be generated by trellis-coded quantizing, by the receiver, channel information using a codebook selected from a plurality of codebooks. The operation of trellis-coded quantizing includes an operation of truncating the channel information and codewords included in the selected codebook into a plurality of groups of channel vectors and a plurality of groups of codewords, and an operation of quantizing each of the groups of the channel vectors using each of the groups of the codewords.

Advantageous Effect

Exemplary embodiments of the present disclosure generate a trellis extended codebook (TEC) using a codebook at a receiver in a multiple-input multiple-out (MIMO) system, and uses the TEC in trellis-coded quantization. This quantization scheme truncates a channel vector and code vectors into a plurality of groups and quantizes the vectors, so that the number of bits of feedback information can be reduced in comparison with a case in which vectors are quantized without being truncated. In addition, exemplary embodiments of the present disclosure include a trellis-extended successive phase adjustment (TE-SPA) scheme for adjusting a phase regarding the result of the trellis-coded quantizing. This scheme makes it possible to provide feedback information of a smaller number of bits during a short time.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9 illustrates a view showing a configuration of a codebook according to an exemplary embodiment of the present disclosure;

FIGS. 10A to 10C illustrate views showing an example of implementation of a trellis-coded quantizer according to an exemplary embodiment of the present disclosure;

FIGS. 11A to 11C illustrate views showing another example of implementation of a trellis-coded quantizer according to an exemplary embodiment of the present disclosure;

FIGS. 12A to 13B illustrate views to illustrate a trellis-coded quantization operation according to an exemplary embodiment of the present disclosure;

FIG. 17 illustrates a view to illustrate an operation of phase-adjusting a result of channel quantization according to another exemplary embodiment of the present disclosure;

FIG. 18 illustrates a view showing an example of implementation of a phase adjuster according to an exemplary embodiment of the present disclosure;

FIGS. 19A to 19C illustrate views showing another example of implementation of a phase adjuster according to an exemplary embodiment of the present disclosure; and FIGS. 20 and 21 illustrate views showing an example of performance enhancement achieved by a trellis-coded quantizer according to exemplary embodiments of the present disclosure.

BEST MODE FOR EMBODYING THE INVENTION

FIGS. 1 to 21 used to explain the principles of the present disclosure in the present patent specification are merely examples and should not be interpreted as limiting the scope of the present disclosure.

Relevant background arts will be explained prior to explaining exemplary embodiments of the present disclosure in detail. In explaining the background arts, reference is made to the following documents:

[REF1] D. J. Ryan, I. V. L. Clarkson, I. B. Collings, D. Guo, and M. L. Honig, "QAM and PSK codebooks for limited feedback MIMO beamforming," IEEE Transactions on Communications, vol. 57, no. 4, pp. 1184-1196, April 2009.

[REF2] J. Choi, Z. Chance, D. J. Love, and U. Madhow, "Noncoherent trellis-coded quantization for massive MIMO limited feedback beamforming," UCSD Information Theory and Applications Workshop, February 2013.

[REF3] J. Choi, D. J. Love, and U. Madhow, "Limited feedback in massive MIMO systems-exploiting channel correlations via noncoherent trellis-coded quantization," Proceedings of Conference on Information Sciences and Systems, March 2013.

[REF4] J. Choi, Z. Chance, D. J. Love, and U. Madhow, "Noncoherent Trellis Coded Quantization: A Practical Limited Feedback Technique for Massive MIMO Systems," submitted to IEEE Transactions on Communications.

[REF5] W. Sweldens, "Fast block noncoherent decoding," IEEE Communications Letters, vol. 5, no. 4, pp. 132-134, April 2001.

[REF6] D. J. Ryan, I. B. Collings, and I. V. L. Clarkson, "GLRT-best noncoherent lattice decoding," IEEE Transaction on Signal Processing, vol. 55, no. 7, pp. 3773-3786, July 2007.

[REF7] M. W. Marcellin, "Trellis coded quantization of memoryless and Gauss-Markov sources," IEEE Transactions on Communications, vol. 38, no. 1, pp. 82-93, January 1990.

[REF8] C. K. Au-Yeung, D. J. Love, and S. Sanayei, "Trellis coded line packing: large dimensional beamforming vector quantization and feedback transmission," IEEE Transactions on Wireless Communications, vol. 10, no. 6, pp. 1844-1853, June 2011.

[REF9] 3GPP TS 36.211 v11.2.0, "Evolved Universal Terrestrial Radio Access (E-UTRA); Physical Channels and Modulation (Release 11)," Technical Specification 3GPP, February 2013.

Figure 1:
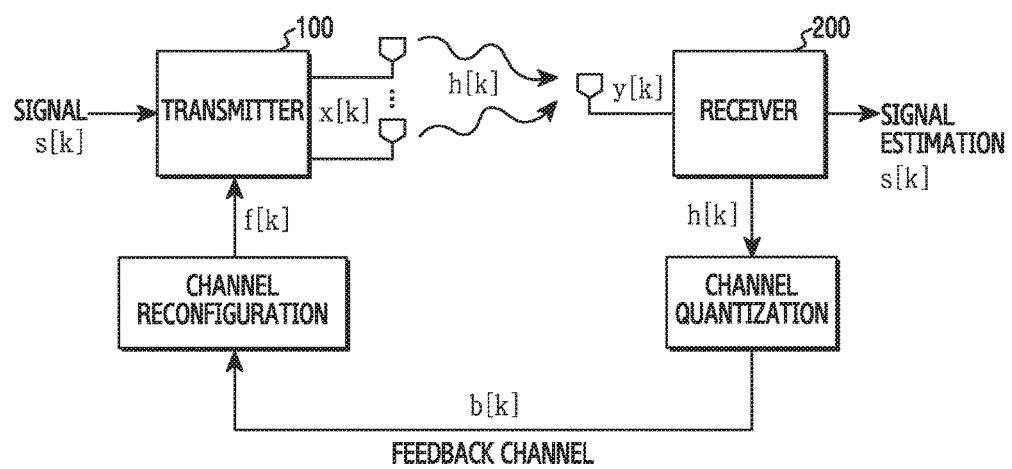
FIG. 1 illustrates a view showing a configuration of a multiple-input single-output (MISO) communication system having feedback.

To simply explanation, it is assumed that a multiple-input single-output (MISO) system including a transmitter including a plurality of transmission antennas (for example, M transmission antennas), and a receiver including a single reception antenna is provided as shown in FIG. 1.

Referring to FIG. 1, the transmitter 100 processes a signal s[k] to be transmitted and transmits the signal as a signal x[k]. The receiver 200 estimates a signal ŝ[k] from a received signal y[k], and generates a binary vector b[k] of a $B_{tot}$ dimension by quantizing a channel vector h[k]. The generated binary vector b[k] is transmitted to the transmitter 100 through a feedback channel as channel state information (CSI). The transmitter 100 receives the channel state information fed back from the receiver 200, and configures a beamforming channel vector f[k] using the feedback information.

In a frequency division duplexing (FDD) system, there is a limited feedback link from the receiver 200 to the transmitter 100 to feed back the CSI. Most of the limited feedback systems including $3^{rd}$ generation partnership project (3GPP) long term evolution (LTE) depend on a normal vector quantized (VQ) codebook $C=\{c_1, c_2, \ldots, c_{2^{B_{tot}}}\}$. This is shared by the transmitter 100 and the receiver 200. $C_i$ is an M×1 complex vector having $\|c_i\|^2=1$ regarding all i. When a VQ codebook approach method is used, the receiver 200 selects a best codeword through an exhaustive search represented by $$c_{opt} = \arg\max_{c \in C} |h^H c|^2$$

(herein, h is an M×1 channel vector). However, this approach method can be implemented only when the total number of codewords is small as in an LTE system, that is, $B_{tot}=4$. Since the calculational complexity ($O(M2^{B_{tot}})$) of the exhaustive search for the best codeword abruptly increases, it is impossible to perform the exhaustive search having large $B_{tot}$ in real time.

However, the number of bits for the codebook should increase in proportion to the number of transmission antennas in order for a CSI quantization error to have a specific level. It is well known that, when a random vector quantization (RVQ) codebook, which is a best VQ codebook having a fixing rate $$\frac{B_{tot}}{M} = B$$

when M→∞ and $B_{tot}$→∞, is used, a loss in a normalized beamforming gain is given as shown in Equation 1 presented below:

$$L(M,B_{tot})=1-E[h^{-H}c_{opt}]\approx 2^{-B_{tot}/M-1} \qquad \text{Equation 1}$$

In Equation 1, $$\bar{h} = \frac{h}{\|h\|}$$

is a normalized channel vector. It is obvious from Equation 1 that feedback overhead should increase in proportion to M in order to maintain a beamforming loss normalized by a specific level. Therefore, a typical method which uses the VQ codebook in combination with the exhaustive search is not useful to the multiple-input multiple-out (MIMO) system due to a complexity issue.

[REF1-REF4] disclose methods for quantizing a channel vector having low complexity in an MISO system. The methods disclosed in [REF1-REF4] depend on duality of a beamforming vector quantization problem and a noncoherent sequence detection problem in an additive white Gaussian noise (AWGN) channel. The duality indicates that the two problems are equivalent to Equation 2 presented below:

$$\arg\max_{c \in C} |h^H c|^2 = \arg\min_{c \in C} \min_{\theta \in [0,2\pi)} \|h - e^{j\theta}c\|^2 \qquad \text{Equation 2}$$

In Equation 2, the left side indicates a beamforming vector quantization problem and the right side indicates a noncoherent sequence detection problem. In the case of the noncoherent sequence detection problem, h is a received signal, $e^{j\theta}$ is a channel coefficient (on the assumption of block fading having a unit amplitude), and c is a candidate transmitted codeword.

The methods in [REF1-REF4] use the duality of the beamforming vector quantization problem and the noncoherent sequence detection problem, but the approach method in [REF1] and the approach methods in [REF2-REF4] are different. The method in [REF1] depends on a maximum likelihood (ML) detection algorithm ([REF5], [REF6]) for detecting a noncoherent sequence. On the other hand, the methods in [REF2-REF4] adopt trellis-coded quantization (TCQ) [REF7] from a source encoding theory. In the two cases, the calculational complexity of channel quantization is noticeably reduced. In particular, in the method in [REF1], the calculational complexities of phase shift keying (PSK) and quadrature amplitude modulation (QAM) constellation points regarding entries of a quantized vector are O (MlogM) and O ($M^3$), respectively. On the other hand, the complexity in the methods in [REF2-REF4] is O (M), and is in proportion to the number of transmission antennas regardless of constellation points regarding entries of a quantized vector.

The concept of use of trellis for channel quantization was introduced in [REF8] for the first time. However, a path metric for a trellis search is sub-optimally selected. This method may greatly degrade the performance in comparison to the methods in [REF2-REF4].

The methods disclosed in [REF1-REF4] may reduce the computational complexity, but feedback overhead is still high for a real system. That is, the methods in [REF1-REF4] only supports channel quantization having an integer number of bits per channel entry. For example, in the case of 32 transmission antennas, the minimum number of feedback bits is 32 bits. The current LTE-Advanced standard supports a linear increase rate of a CSI feedback bit with respect to the number of antennas. That is, the LTE-Advanced standard supports four bits in total in the case of four transmission antennas, and supports 8 bits in total in the case of eight transmission antennas. However, 32-bit CSI feedback for the 32 transmission antennas would not be actually allowed.

Exemplary embodiments of the present disclosure, which will be described below, relate to a scheme for reducing feedback overhead when channel state information is quantized at a receiver in a MIMO system and is fed back to a transmitter. Exemplary embodiments of the present disclosure include a scheme for generating a trellis-extended codebook (TEC) using a codebook and using the generated TEC for trellis-coded quantization, and a trellis-extended successive phase adjustment (TE-SPA) scheme for adjusting a phase for the result of the trellis-coded quantizing. These schemes are similar to a structure of W=W1W2 in a 3GPP LTE-Advanced 8 transmission (Tx) antenna codebook. Herein, W1 indicates wideband/long-term channel information and W2 indicates subband/short-term channel information. The TEC and the TE-SPA may be regarded as W1 and W2, respecitvely.

In explaining the TEC, an LTE 4Tx codebook is used. However, any other VQ codebooks such as discrete Fourier transform (DFT), residual vector quantization (RVQ), and Grassmannian-line-packing (GLP) codebooks may be used.

Exemplary embodiments of the present disclosure depend on TCQ similarly to the methods in [REF2-REF4]. This method has computational complexity of O (M). On the other hand, exemplary embodiments of the present disclosure may support a fractional number of bits per channel entry quantization. Therefore, exemplary embodiments of the present disclosure have feedback overhead which is even lower than in the methods in [REF2-REF4].

In addition, exemplary embodiments of the present disclosure use a trellis structure for successive phase adjustment. The trellis for successive phase adjustment may be different from a trellis for a TEC.

Figure 2:
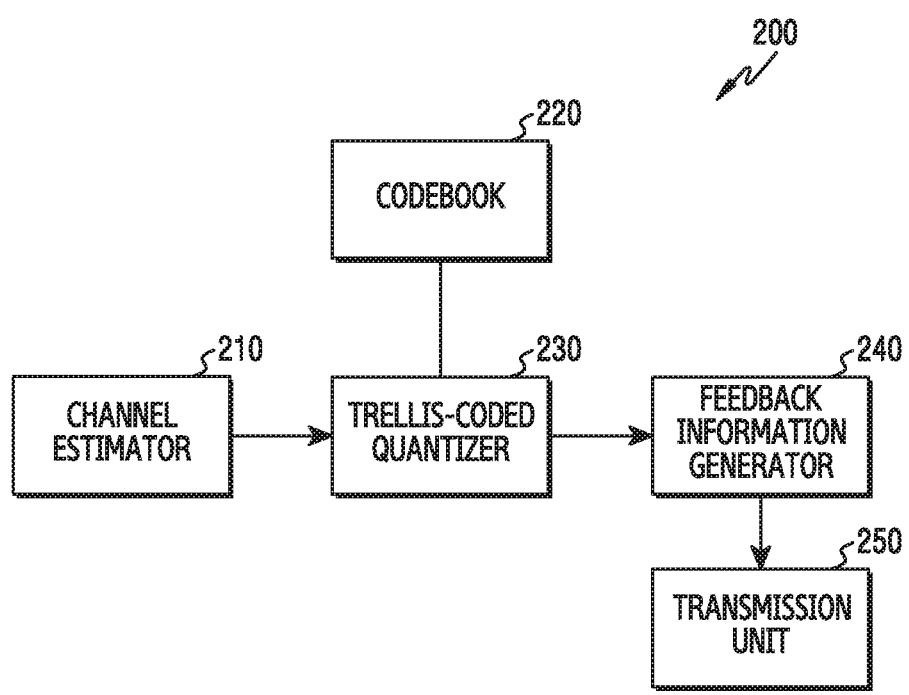
FIG. 2 illustrates a view showing a configuration of a receiver to be used in a multiple-input multiple-out (MIMO) communication system according to an exemplary embodiment of the present disclosure.

FIG. 2 illustrates a view showing a configuration of a receiver to be used in a MIMO communication system according to an exemplary embodiment of the present disclosure. This configuration may be included in the receiver 200 shown in FIG. 1.

Referring to FIG. 2, the receiver 200 includes a channel estimator 210, a codebook 220, a trellis-coded quantizer 230, a feedback information generator 240, and a transmission unit 250. The channel estimator 210 receives a signal (for example, a pilot signal) transmitted from the transmitter 100 shown in FIG. 1, and estimates a reception channel. The codebook 220 stores a pre-defined codebook. For example, the codebook 220 stores a 3GPP LTE 4Tx codebook of a form shown in FIG. 9.

$W_n^{\{s\}}$ indicates a matrix which is defined by columns given by a set $\{s\}$ from an equation $W_n = I - 2u_n u_n^H / u_n^H u_n$. Herein, I is a 4×4 identity matrix, and a vector $u_n$ is given as shown in FIG. 9. $C_{LTE,1}$, which is a 4Tx rank (or a layer) 1 codebook, equals $C_{LTE,1} = \{W_k^{\{1\}}\}_{k=0}^{15}$.

The trellis-coded quantizer 230 trellis-coded quantizes reception channel information which is estimated by the channel estimator 210 using a codebook which is selected from a plurality of codebooks stored in the codebook 220. The feedback information generator 240 generates feedback information including the result of the quantizing by the trellis-coded quantizer 230. The transmission unit 250 transmits the generated feedback information to the transmitter 100 shown in FIG. 1.

The trellis-coded quantizer 230 truncates the reception channel information and codewords included in the selected codebook into a plurality of groups of channel vectors and a plurality of groups of codewords, and trellis-coded quantizes each of the groups of the channel vectors using each of the groups of the codewords.

In one embodiment, the trellis-coded quantizer 230 truncates the reception channel information and the codewords into M/L groups of the channel vectors and M/L groups of the codewords (herein, M is the number of transmission antennas of the transmitter, and L is a predetermined number).

In one embodiment, the trellis-coded quantizer 230 allocates the groups of the codewords to outputs from a trellis structure corresponding to a pre-defined convolutional encoder, searches a path for the trellis structure, and outputs information indicating a best codeword corresponding to a best path as a result of the search the path as the result of the quantizing corresponding to the groups of the channel vectors.

In one embodiment, the trellis-coded quantizer 230 searches a path for the trellis structure in a pre-defined search range (for example, $\theta \in \Theta = \{\theta_1, \ldots, \theta_K\}$, $$\theta_k = \frac{2(k-1)\pi}{K})$$

out of an entire search range (for example, [0, 2π)).

In one embodiment, the trellis-coded quantizer 230 allocates the groups of the codewords to the outputs from the trellis structure such that a minimum Euclidean distance between codewords allocated to an odd-numbered output and an even-numbered output of the trellis structure is maximized.

In one embodiment, the convolutional encoder includes one of a ¾ rate convolutional encoder, a ⅔ rate convoluntaionl encoder, or a convolutional encoder having a certain rate.

Figure 3:
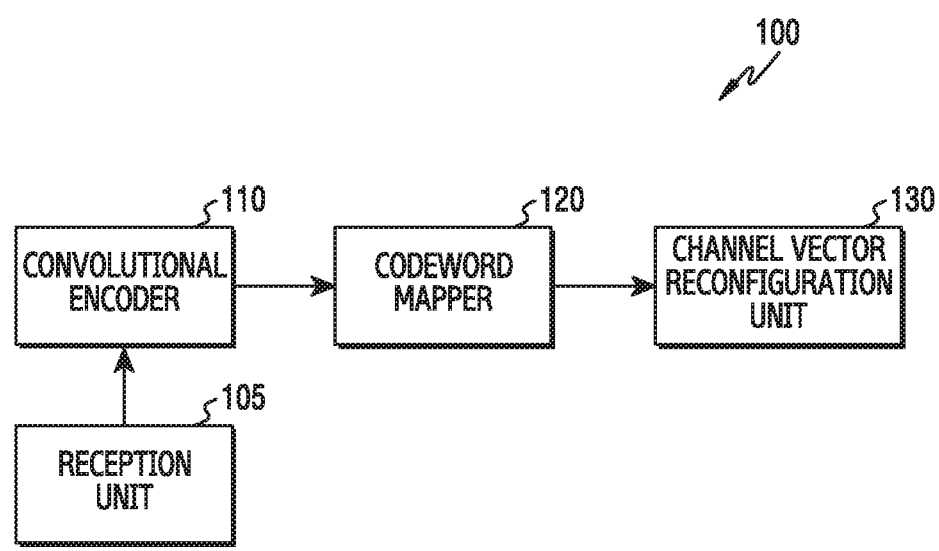
FIG. 3 illustrates a view showing a configuration of a transmitter to be used in a MIMO communication system according to an exemplary embodiment of the present disclosure.

FIG. 3 illustrates a view showing a configuration of a transmitter to be used in a MIMO communication system according to an exemplary embodiment of the present disclosure. This configuration may be included in the transmitter 100 shown in FIG. 1.

Referring to FIG. 3, the transmitter 100 includes a reception unit 105, a convolutional encoder 110, a codeword mapper 120, and a channel vector reconfiguration unit 130.

The reception unit 105 receives feedback information from the receiver 200 shown in FIG. 1. The feedback information includes the result of the trellis-coded quantizing. The feedback information is generated by trellis-coded quantizing, by the receiver 200, reception channel information using a codebook which is selected from a plurality of codebooks. The operation of trellis-coded quantizing includes: an operation of truncating the reception channel information and codewords included in the selected codebook into a plurality of groups of channel vectors and a plurality of groups of codewords; and an operation of quantizing each of the groups of the channel vectors using each of the groups of the codewords.

In one embodiment, the operation of trellis-coded quantizing includes: an operation of allocating the groups of the codewords to outputs from a trellis structure corresponding to the convolutional encoder; an operation of searching a path for the trellis structure; and an operation of outputting information indicating a best codeword corresponding to a best path as a result of the searching the path as the result of the quantizing corresponding to the groups of the channel vectors.

In one embodiment, the operation of searching the path includes an operation of searching the path for the trellis structure in a pre-defined search range of an entire search range.

In one embodiment, the groups of the codewords are allocated to the outputs from the trellis structure such that a minimum Euclidean distance between codewords allocated to an odd-numbered output and an even-numbered output from the trellis structure is maximized.

In one embodiment, the reception channel information includes a result of channel estimating a received pilot signal.

The convolutional encoder 110 performs convolutional encoding for the feedback information. In one embodiment, the convolutional encoder includes one of a ¾ rate convolutional encoder, a ⅔ rate convolutional encoder, or a convolutional encoder having a certain rate. The codeword mapper 120 maps the result of the convolutional encoding onto codewords according to a pre-defined mapping regulation (for example, FIG. 10C, FIG. 11C). The channel vector reconfiguration unit 130 reconfigures a quantized channel vector according to the mapped codewords.

Figure 4:
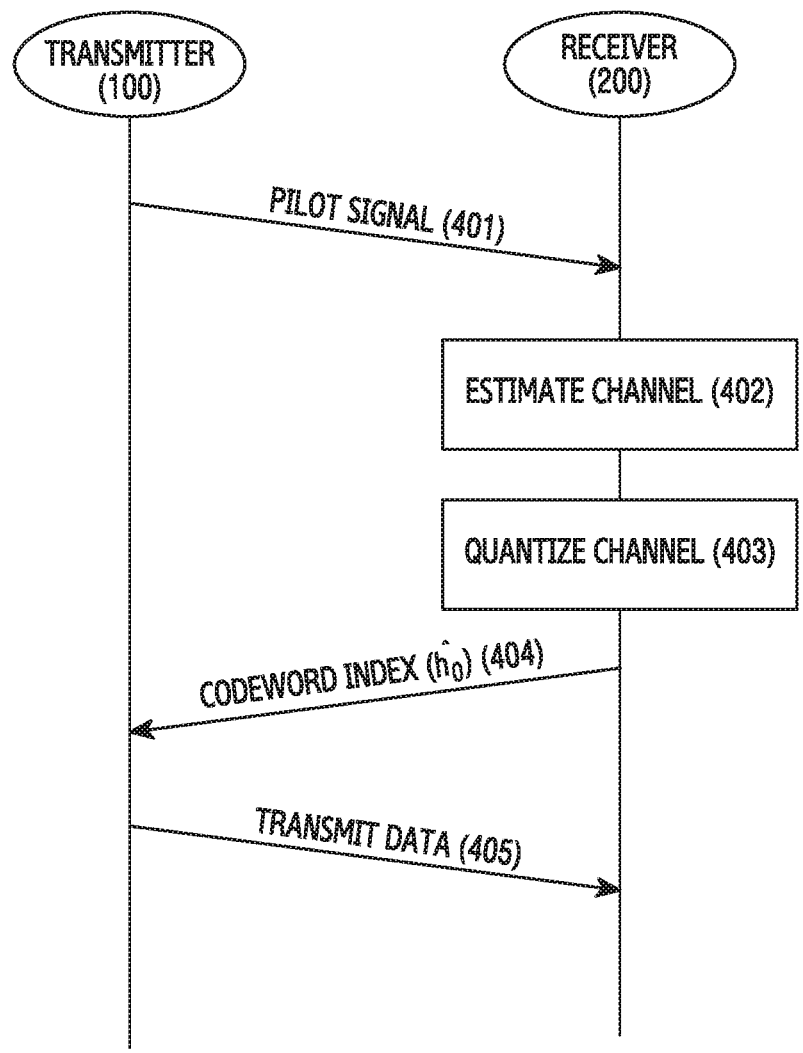
FIG. 4 illustrates a view showing operations of quantizing a channel and feeding back the result of the quantizing between the transmitter and the receiver in the MIMO communication system according to an exemplary embodiment of the present disclosure.

FIG. 4 illustrates a view showing operations of quantizing a channel and feeding back the result of the quantizing between the transmitter and the receiver in the MIMO communication system according to an exemplary embodiment of the present disclosure.

Referring to FIG. 4, the transmitter 100 transmits a pilot signal and the receiver 200 receives the pilot signal transmitted from the transmitter 100 (401). The receiver 200 estimates a reception channel using the received pilot signal (402). The receiver 200 quantizes the received reception channel using a trellis-extended codebook (403). The receiver 200 feeds back a best codeword index which is selected as the result of the quantizing to the transmitter 100 (404). The transmitter 100 reconfigures a channel vector based on the information fed back from the receiver 200, and transmits data using the reconfigured channel vector (405). The channel quantization operation of the receiver 200 described above will be explained in detail below.

Figure 5:
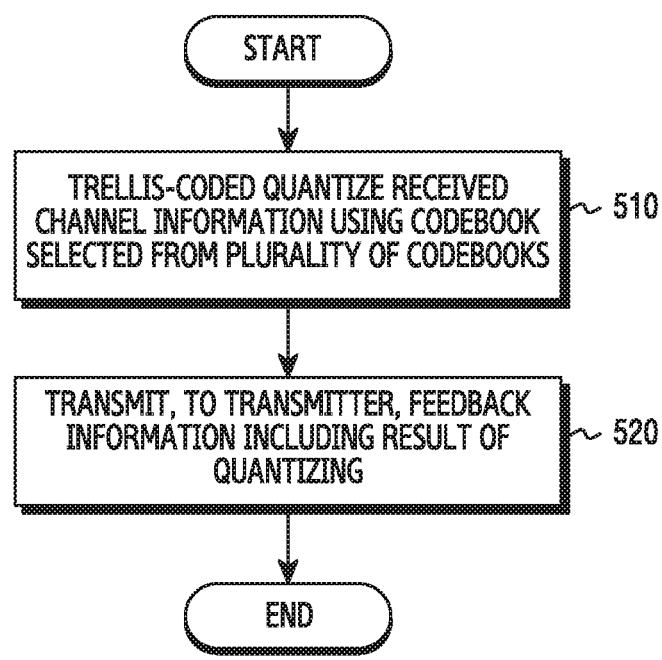
FIG. 5 illustrates a view showing operations of quantizing a channel and feeding back the result of the quantizing at the receiver in the MIMO communication system according to an exemplary embodiment of the present disclosure.

FIG. 5 illustrates a view showing operations of quantizing a channel and feeding back the result of the quantizing at the receiver in the MIMO communication system according to an exemplary embodiment of the present disclosure. For example, these operations may be performed by the receiver 200 shown in FIGS. 1 and 2.

Referring to FIG. 5, the trellis-coded quantizer 230 of the receiver 200 trellis-coded quantizes reception channel information using a codebook which is selected from a plurality of codebooks (510). The feedback information generator 240 of the receiver 200 generates feedback information including the result of the quantizing, and the transmission unit 250 transmits the generated feedback information to the transmitter 100 shown in FIG. 1 (520).

The process of trellis-coded quantizing the reception channel information (510) includes: a process of truncating the reception channel information and codewords included in the selected codebook into a plurality of groups of channel vectors and a plurality of groups of codewords; and a process of trellis-coded quantizing each of the groups of the channel vectors using each of the groups of the codewords.

In one embodiment, the process of trellis-coded quantizing the reception channel information includes a process of truncating the reception channel information and the codewords into M/L groups of the channel vectors and M/L groups of the codewords (M is the number of transmission antennas of the transmitter and L is a predetermined number).

In one embodiment, the process of trellis-coded quantizing the reception channel information includes: a process of allocating the groups of the codewords to outputs from a trellis structure corresponding to a pre-defined convolutional encoder; a process of searching a path for the trellis structure; and a process of outputting information indicating a best codeword corresponding to a best path as a result of the searching the path as the result of the quantizing corresponding to the groups of the channel vectors.

In one embodiment, the process of searching the path includes a process of searching the path for the trellis structure in a pre-defined search range of an entire search range.

In one embodiment, the process of allocating the groups of the codewords to the outputs from the trellis structure corresponding to the pre-defined convolutional encoder includes a process of allocating the groups of the codewords to the outputs from the trellis structure such that a minimum Euclidean distance between codewords allocated to an odd-numbered output and an even-numbered output from the trellis structure is maximized.

In one embodiment, the convolutional encoder includes one of a ¾ rate convolutional encoder, a ⅔ rate convolutional encoder, or a convolutional encoder having a certain rate.

In one embodiment, the reception channel information includes a result of channel-estimating a received pilot signal.

Figure 6:
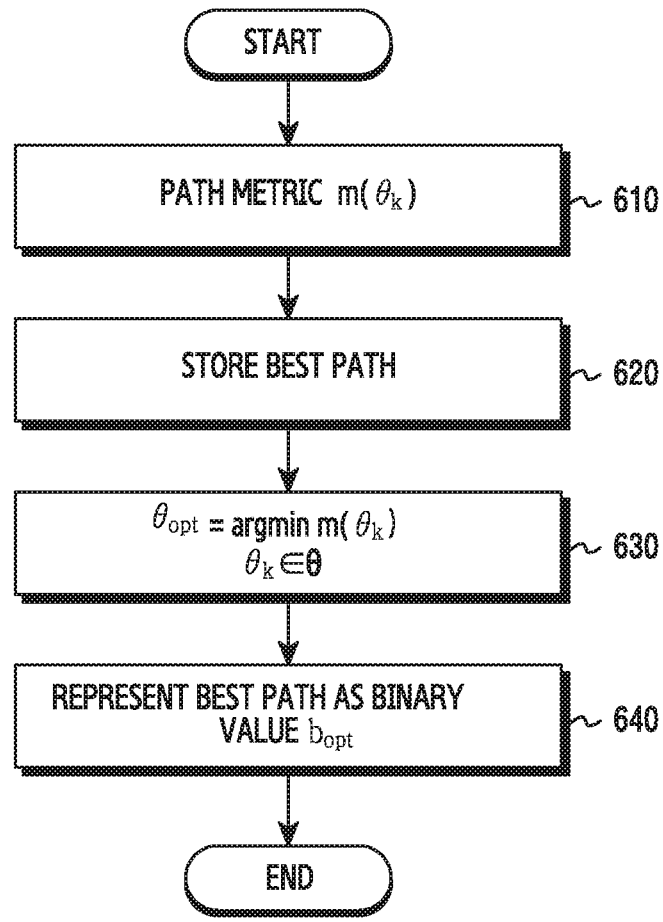
FIG. 6 illustrates a view showing a detailed process flow of a channel quantization operation at the receiver in the MIMO communication system according to an exemplary embodiment of the present disclosure.

FIG. 6 illustrates a view showing a detailed process flow of a channel quantization operation at the receiver in the MIMO communication system according to an exemplary embodiment of the present disclosure. For example, this operation may be performed by the trellis-coded quantizer 230 of the receiver 200 of FIG. 2.

Referring to FIG. 6, the quantizer 230 minimizes a path metric as shown in Equation 3 presented below, regarding a channel vector h having $\theta_k \in \Theta = \{\theta_1, \ldots, \theta_K\}$, using a Viterbi algorithm (610):

$$m(\theta_k) = \min_{c_{[L(t-1)+1:Lt]} \in C_{LTE,1}} \sum_{t=1}^{M/L} \|h_{[L(t-1)+1:Lt]} - e^{j\theta_k} c_{[L(t-1)+1:Lt]}\|^2 \quad \text{Equation 3}$$

The quantizer 230 stores a best path which provides a minimum value m ($\theta_k$) of the path matric (620).

The quantizer 230 selects $\theta_{opt}$ as shown in Equation 4 presented below, which provides a minimum value from among minimum values m ($\theta_k$) regarding $\theta_k \in \Theta = \{\theta_1, \ldots, \theta_K\}$:

$$\theta_{opt} = \arg\min_{\theta_k \in \Theta} m(\theta_k) \quad \text{Equation 4}$$

The quantizer 230 represents the best path of m ($\theta_{opt}$) as a binary value $b_{opt}$ (640). This binary value configures an input rather than an output of a best path in the trellis.

Figure 7:
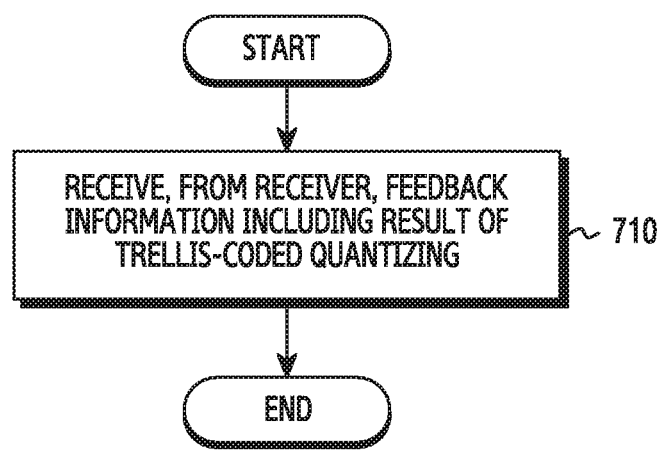
FIG. 7 illustrates a view showing feedback information reception at the transmitter in the MIMO communication system according to an exemplary embodiment of the present disclosure.

FIG. 7 illustrates a view showing feedback information reception at the transmitter in the MIMO communication system according to an exemplary embodiment of the present disclosure. For example, this operation may be performed by the transmitter 100 shown in FIGS. 1 and 3.

Referring to FIG. 7, the transmitter 100 receives feedback information including the result of the trellis-coded quantizing from the receiver 200 shown in FIG. 1 (710). The feedback information is generated by trellis-coded quantizing, by the receiver 200, reception channel information using a codebook which is selected from a plurality of codebooks. The operation of trellis-coded quantizing includes: an operation of truncating the reception channel information and codewords included in the selected codebook into a plurality of groups of channel vectors and a plurality of groups of codewords; and an operation of quantizing each of the groups of the channel vectors using each of the groups of the codewords.

In one embodiment, the operation of trellis-coded quantizing includes: an operation of allocating the groups of the codewords to outputs from a trellis structure corresponding to the convolutional encoder; an operation of searching a path for the trellis structure; and an operation of outputting information indicating a best codeword corresponding to a best path as a result of the searching the path as the result of the quantizing corresponding to the groups of the channel vectors.

In one embodiment, the operation of searching the path includes an operation of searching the path for the trellis structure in a pre-defined search range of an entire search range.

In one embodiment, the groups of the codewords are allocated to the outputs from the trellis structure such that a minimum Euclidean distance between codewords allocated to an odd-numbered output and an even-numbered output from the trellis structure is maximized.

In one embodiment, the reception channel information includes a result of channel-estimating a received pilot signal.

Figure 8:
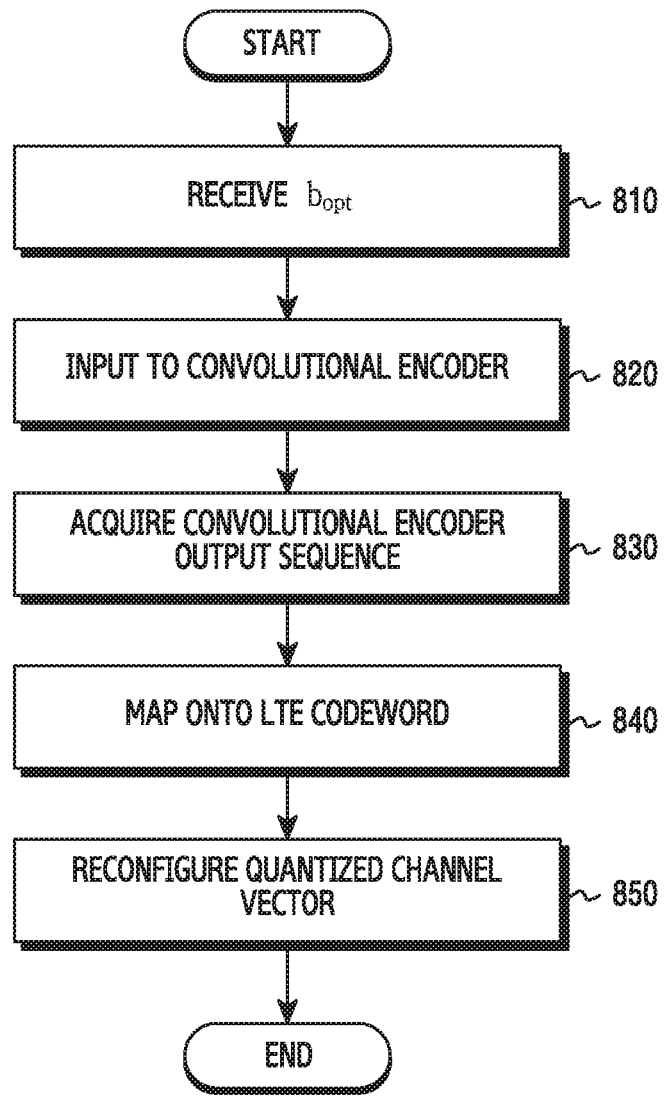
FIG. 8 illustrates a view showing a detailed process flow of operations of receiving feedback information and reconfiguring a channel vector at the transmitter in the MIMO communication system according to an exemplary embodiment of the present disclosure.

FIG. 8 illustrates a view showing a detailed process flow of operations of receiving feedback information and reconfiguring a channel vector at the transmitter in the MIMO communication system according to an exemplary embodiment of the present disclosure. For example, these operations may be performed by the transmitter 100 shown in FIG. 3.

Referring to FIG. 8, the reception unit 105 of the transmitter 100 receives a binary value $b_{opt}$ included in information fed back from the receiver 200 shown in FIG. 1 (810). The convolutional encoder 110 receives the received binary value $b_{opt}$ as an input (820), and outputs a sequence corresponding to this input (830). The codeword mapper 120 maps the output sequence of the convolutional encoder 110 onto a codeward (for example, an LTE codeword) according to a pre-defined mapping regulation (for example, FIG. 10C, 11C) (840). The channel vector reconfiguration unit 130 reconfigures a quantized channel vector from the result of the mapping of the codeword mapper 120 (850).

Hereinafter, examples of an operation of trellis-coded quantizing using a trellis-extended codebook according to an exemplary embodiment of the present disclosure will be explained with reference to FIGS. 10A to 13B. In explaining this quantization operation, a trellis-extended codebook using an LTE 4Tx codebook as shown in FIG. 9 may be used.

Figure 10A:
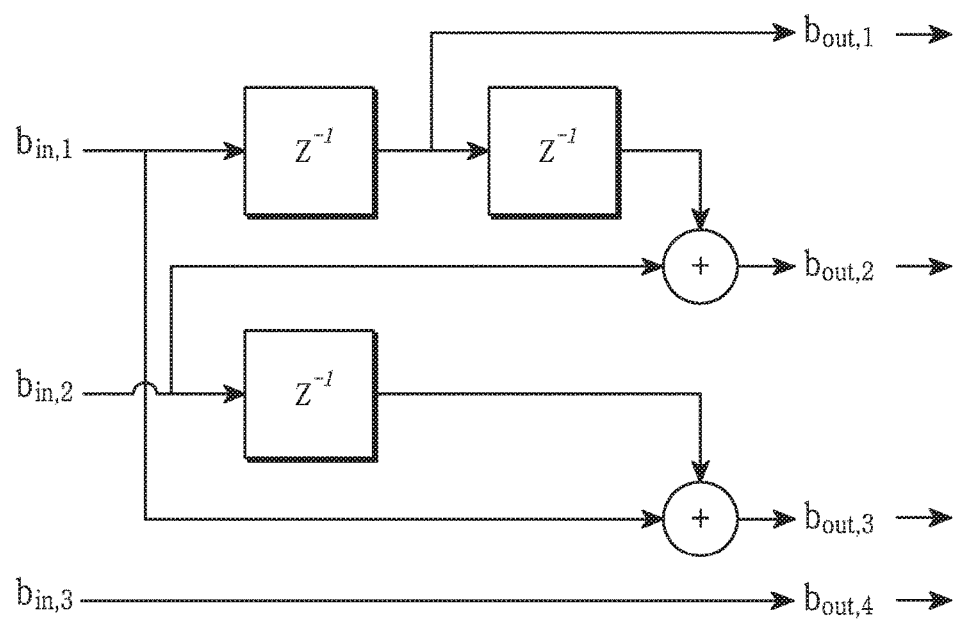
Figure 10B:
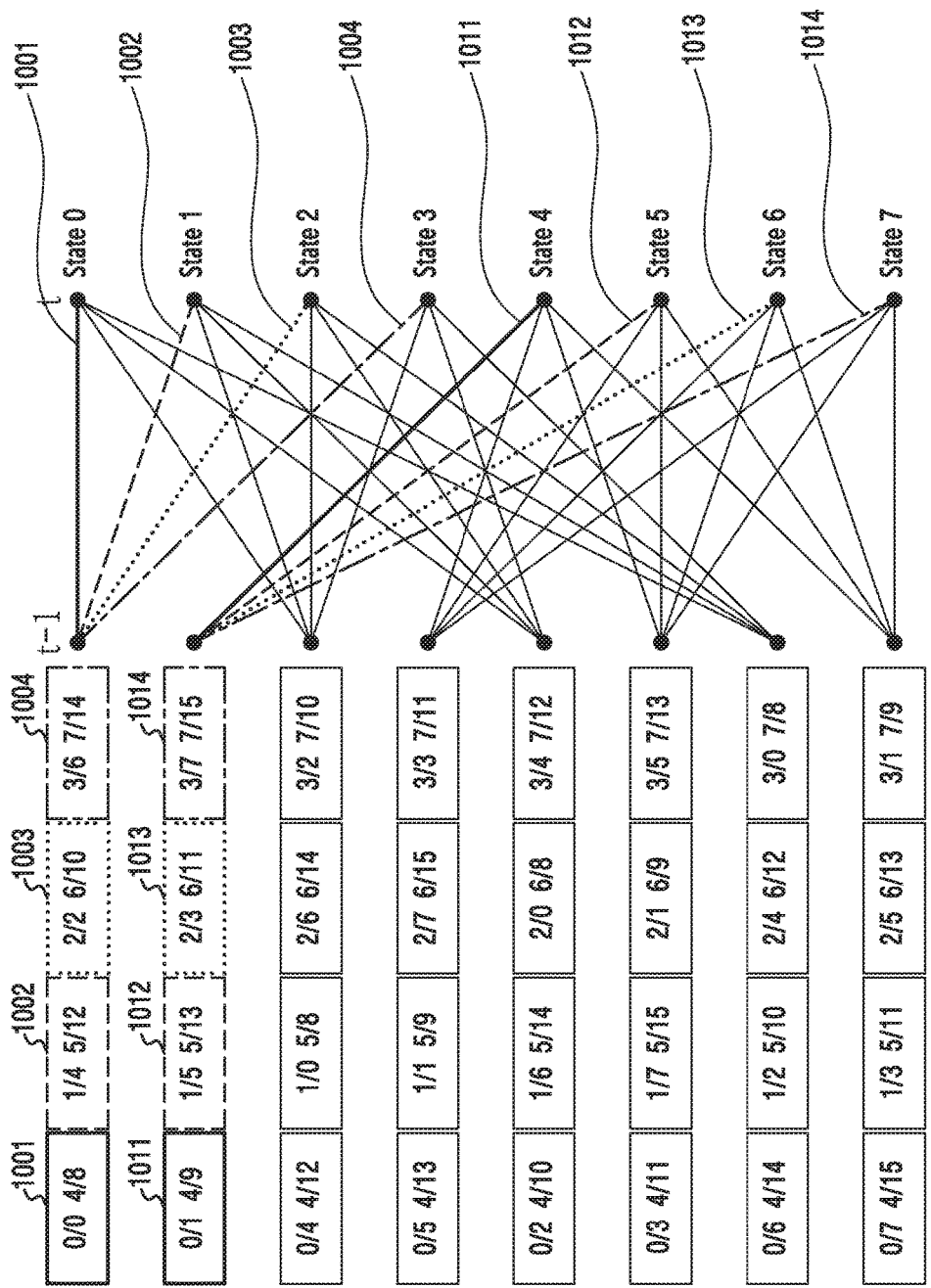

FIGS. 10A to 10C illustrate views showing one example of implementation of a trellis-coded quantizer according to an exemplary embodiment of the present disclosure. This example corresponds to an example of implementing a trellis-coded quantizer using a ¾ rate convolutional encoder, and ¾ bit may be outputted per channel entry quantization through this quantizer.

FIG. 10A illustrates the configuration of the ¾ rate convolutional encoder. Herein, as an index is smaller, the importance of bits is lesser. For example, $b_{in,1}$ is an input bit of a least significant bit (LSB) and $b_{in,3}$ is an input of a most significant bit (MSB).

FIG. 10B illustrates an representation of a trellis structure corresponding to the ¾ rate convolutional encoder shown in FIG. 10A. Each of the state transitions illustrated on the right of the drawing is configured as a parallel transition which indicates an input/output relationship using decimal numbers in each box on the left. For example, at transition 1002 from state 0 to state 1, indicated by a dashed line, ¼ (decimal number) corresponds to input=001/output=0100 (binary numeral) and 5/12 (decimal number) corresponds to input=101/output=1100 (binary numeral).

FIG. 10C illustrates a view showing a table for mapping 3GPP LTE 4Tx rank 1 codewords onto outputs from the trellis structure shown in FIG. 10B.

Equation 2 indicating the duality of the beamforming vector quantization problem and the noncoherent sequence detection problem in the AWGN channel will be referred to again. The noncoherent sequence detection problem in the AWGN channel is similar to a source encoding problem as shown in Equation 5 presented below:

$$c_{opt} = \arg\min_{c \in C} \|h - e^{j\theta}c\|^2 \quad \text{Equation 5}$$

Equation 5 indicates a source encoding problem for finding a best codeword $c_{opt}$ which minimizes a mean squared error having h regarding given $\theta$. Therefore, an exemplary embodiment of the present disclosure depends on the concept of trellis-coded quantization (TCQ) [REF5] which is a source encoding technique for extending an LTE codebook for a large scale MIMO system.

The TCQ uses a trellis decoder and a convolutional encoder in channel encoding as a source encoder and a source decoder in source encoding, respectively.

In one embodiment of the present disclosure, a TEC including a ¾ rate convolutional encoder as shown in FIG. 10A, and a TEC having a trellis representation corresponding thereto as shown in FIG. 10B may be used. However, various types of convolutional encoders and trellis representations thereof may be used for the TEC according to an exemplary embodiment of the present disclosure. For example, a TEC having a ⅔ rate convolutional encoder shown in FIG. 11A and a trellis representation corresponding thereto as shown in FIG. 11B may be used.

The object function in Equation 5 having a given $\theta$ may be decomposed as shown in Equation 6 presented below:

$$\|h - e^{j\theta}c\|^2 = \sum_{t=1}^{M/L} \|h_{[L(t-1)+1:Lt]} - e^{j\theta}c_{[L(t-1)+1:Lt]}\|^2 \qquad \text{Equation 6}$$

In Equation 6, L is a design parameter and $h_{[m:n]}$ and $c_{[m:n]}$ are truncated vectors placed between the m-th entry and the n-th entry in a channel vector h and a code vector c, respectively. For example, when the channel vector h has a size of M (the number of transmission antennas of the transmitter) (for example, 16) as shown in FIG. 12A, the channel vector h may be truncated into M/L (for example, 16/4=4) channel vectors, and the truncated channel vectors 1201-1204 each may have four codewords.

In Equation 6, the object function may be effectively calculated using a Viterbi algorithm. That is, at each of the state transitions t, a single truncated channel vector $h_{[L(t-1)+1:Lt]}$ having a size of L×1 is quantized into a corresponding code vector $c_{[L(t-1)+1:Lt]}$. After M/L state transitions, a best codeword $c_{opt}$ can be found to minimize Equation 6 due to optimality of the Viterbi algorithm. A path search using the Viterbi algorithm starts from state 0 at the trellis. Otherwise, the receiver must feed back information on the start state of the best path to the transmitter. This may increase the entire feedback overhead.

Regarding t=1, . . . , M/L, it is assumed that $c_{[L(t-1)+1:Lt]} \in C_{LTE,1}$. Herein, $C_{LTE,1}$ is the 3GPP LTE 4Tx rank 1 codebook defined in FIG. 9. In this case, L=4. However, a certain codebook having a different L value as in a 3GPP LTE 2Tx rank 1 codebook may be used. In addition, when spatial multiplexing having multiple reception antennas is performed, a upper rank codebook regarding $c_{[L(t-1)+1:Lt]}$ may be selected using the Frobenius norm operation.

Referring to FIG. 10B, transition from states 0, 2, 4, 6 (decimal number) has only outputs of even numbers 0, 2, 4, 6, 8, 10, 12, 14 (decimal number), and transition from states 1, 3, 5, 7 (decimal number) has only outputs of odd numbers 1, 3, 5, 7, 9, 11, 13, 15 (decimal number). Therefore, even if 16 codewords in total can be used, an exemplary embodiment of the present disclosure uses only 3 bits to quantize an entry of L=4 of the channel vector h at each of the state transitions, and outputs the result of ¾ bit per entry quantization.

The codeword $W_k^{\{1\}}$ (k=0, . . . , 15) of $C_{LTE,1}$ shown in FIG. 9 is allocated to the output of the convolutional encoder shown in FIG. 10A or the output of the trellis representation shown in FIG. 10B. To minimize a quantization error, the minimum Euclidean distance between the codewords allocated to sets of odd-numbered outputs and even-numbered outputs in the trellis is maximized.

It is assumed that $C_{LTE,1}^{(1)}$ and $C_{LTE,1}^{(2)}$ indicate all possible truncations having the same cardinality as shown in Equation 7 presented below:

$$C_{LTE,1}^{(1)} \cup C_{LTE,1}^{(2)} = C_{LTE,1}$$

$$C_{LTE,1}^{(1)} \cap C_{LTE,1}^{(2)} = \phi$$

$$\text{card}(C_{LTE,1}^{(1)}) = \text{card}(C_{LTE,1}^{(1)}) = 8 \qquad \text{Equation 7}$$

In Equation 7, card(•) indicates the cardinality of a relevant set, and $\phi$ indicates a null set.

It is assumed that $c_i^{(1)} \in C_{LTE,1}^{(1)}$ and $c_i^{(2)} \in C_{LTE,1}^{(2)}$. If $C_{odd}$ and $C_{even}$ are defined as sets of codewords allocated to the odd-numbered outputs and the even-numbered outputs, respectively, $C_{odd}$ and $C_{even}$ may be represented by Equation 8 presented below:

$$C_{odd} = \underset{C_{LTE,1}^{(1)} \subset C_{LTE,1}}{\arg\max} \min_{m \neq n} \|c_m^{(1)} - c_n^{(1)}\|^2 \qquad \text{Equation 8}$$

$$C_{even} = \underset{C_{LTE,1}^{(2)} \subset C_{LTE,1}}{\arg\max} \min_{m \neq n} \|c_m^{(2)} - c_n^{(2)}\|^2$$

Through an exhaustive search, the LTE codewords may be allocated to the odd-numbered and even-numbered trellis outputs as shown in FIG. 10C. The even-numbered trellis outputs 0, 2, 4, 6, 8, 10, 12, 14 are allocated to LTE codeword indexes 0, 4, 2, 6, 1, 5, 3, 7, respectively. The odd-numbered trellis outputs 1, 3, 5, 7, 9, 11, 13, 15 are allocated to LTE codeword indexes 8, 12, 10, 14, 9, 13, 11, 15, respectively. FIG. 10C illustrates merely an example of mapping between the LTE codewords and the trellis outputs. Therefore, mapping between the codewords and the trellis outputs may be performed in other forms.

In the above description, it was assumed that $\theta$ was given in advance. However, $\theta$ may be a parameter which should be optimized in Equation 6. Instead of searching the entire space [0,2π), $\theta$ may be parameterized as in $\theta \in \Theta = \{\theta_1, \ldots, \theta_K\}$ (herein, $$\theta_k = \frac{2(k-1)\pi}{K}),$$

and a search regarding a designated range $\Theta$ may be represented by Equation 9 presented below:

$$\underset{c \in C}{\arg\min} \min_{\theta \in \Theta} \|h - e^{j\theta}c\|^2 \qquad \text{Equation 9}$$

As a result, the solving method of Equation 9 is obtained by performing the Viterbi algorithm K times when the Viterbi algorithm is executed using a given $\theta$. This parallel search increases only complexity and does not increase the feedback overhead. This is because $\theta$ is not required for a channel reconfiguration process at the transmitter.

Figure 11A:
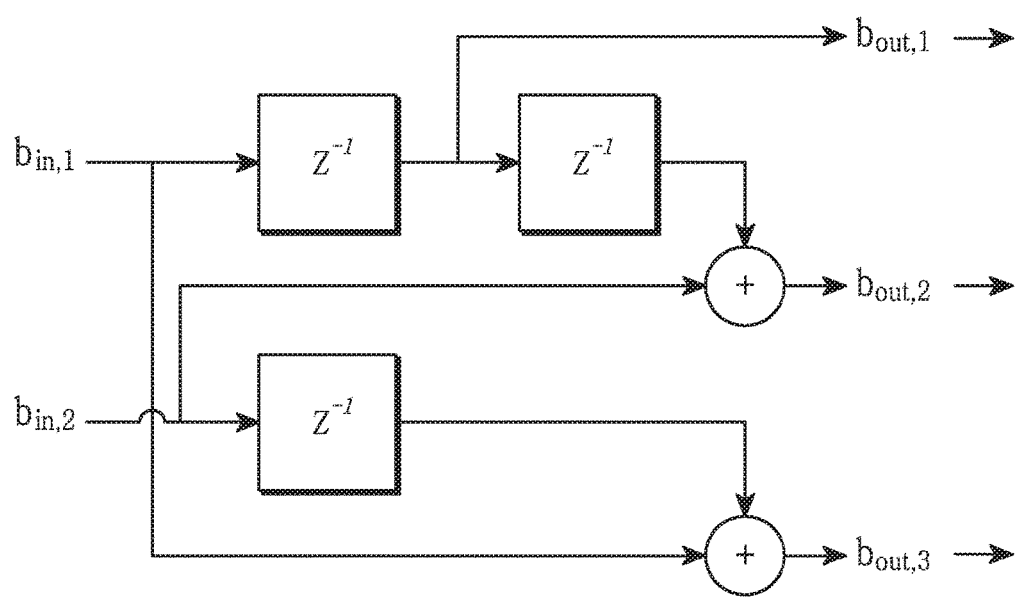
Figure 11B:
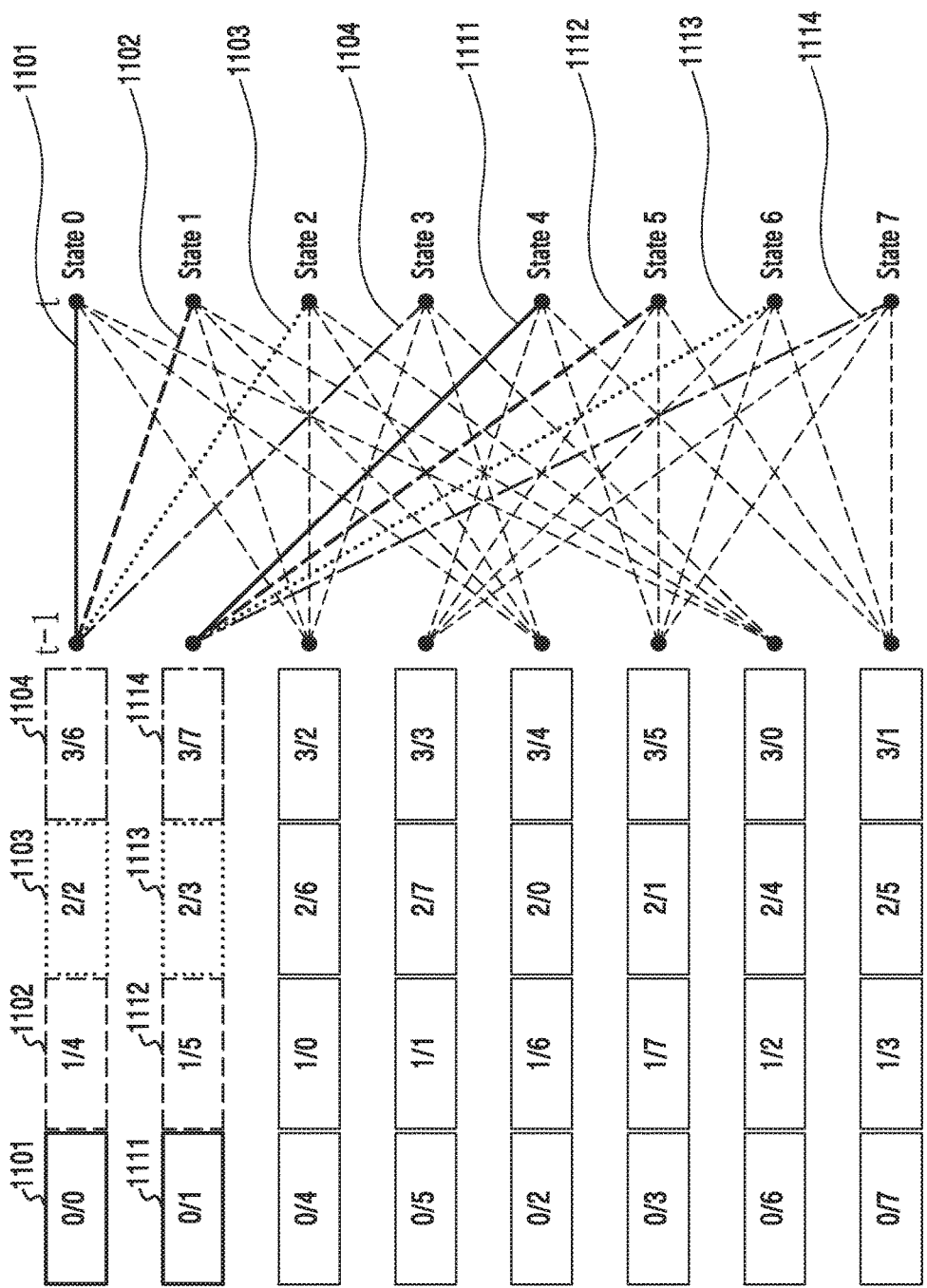

FIGS. 11A to 11C illustrate views showing another example of implementation of a trellis-coded quantizer according to an exemplary embodiment of the present disclosure. This example corresponds to an example of implementing a trellis-coded quantizer using a ⅔ rate convolutional encoder, and ½ bit may be outputted per channel entry quantization through this quantizer.

FIG. 11A illustrates the configuration of the ⅔ rate convolutional encoder. Herein, as an index is smaller, the importance of bits is lesser. For example, $b_{in,1}$ is an input bit of a least significant bit (LSB) and $b_{in,2}$ is an input of a most significant bit (MSB).

FIG. 11B illustrates an representation of a trellis structure corresponding to the ⅔ rate convolutional encoder shown in FIG. 11A. Each of the state transitions illustrated on the right of the drawing is configured as a parallel transition which indicates an input/output relationship using decimal numbers in each box on the left. For example, at transition 1102 from state 0 to state 1, indicated by a dashed line, ¼ (decimal number) corresponds to input=01/output=100 (binary numeral).

FIG. 11C illustrates a view showing a table for mapping 3GPP LTE 4Tx rank 1 codewords onto outputs from the trellis structure shown in FIG. 11B.

The ¾ rate convolutional encoder shown in FIG. 10A is changed to the ⅔ rate convolutional encoder as shown in FIG. 11A, so that a TEC having ½ bit per channel entry quantization can be easily implemented.

In the case of ½ bit per channel entry quantization, the LTE codewords may be allocated to the odd-numbered and even-numbered trellis outputs as shown in FIG. 11C. The even-numbered trellis outputs 0, 2, 4, 6 are allocated to LTE codeword indexes 0, 1, 2, 3, respectively. The odd-numbered trellis outputs 1, 3, 5, 7 are allocated to LTE codeword indexes 4, 5, 6, 7, respectively. FIG. 11C illustrates merely an example of mapping between the LTE codewords and the trellis outputs. Therefore, mapping between the codewords and the trellis outputs may be performed in other forms.

FIGS. 12A to 13B illustrate views to explain a trellis-coded quantization operation according to an exemplary embodiment of the present disclosure. This operation corresponds to an example of a quantization operation which has a trellis-extended codebook using an LTE 4Tx codebook and outputs ½ bit per channel entry quantization.

It is assumed that the number of transmission antennas (M) is 16, the channel vector h is as shown in FIG. 12A, and $\Theta=\{0, \pi\}$. Therefore, to quantize the channel vector h, the Viterbi algorithm is executed two times. The channel vector h having the size of M=16 is truncated into M/L (=16/4=4) groups (or channel entries) 1201-1204. The channel vectors of each group are trellis-coded quantized using truncated groups of code vectors corresponding to a codebook which is selected from codebooks.

When channel information is quantized using an existing LTE codebook as it is, the number of bits of the feedback information is determined in proportion to the number of transmission antennas. For example, when there are 16 transmission antennas, the feedback information is determined to be 16 bits long. However, according to an exemplary embodiment of the present disclosure, when the ⅔ rate convolutional encoder is used for trellis-coded quantization, the result of the quantizing of each group of the channel vectors may be determined to be 2 bits long. In this case, since the channel vectors are grouped to four groups, the resulting feedback information may be implemented by 8 bits.

Figure 13A:
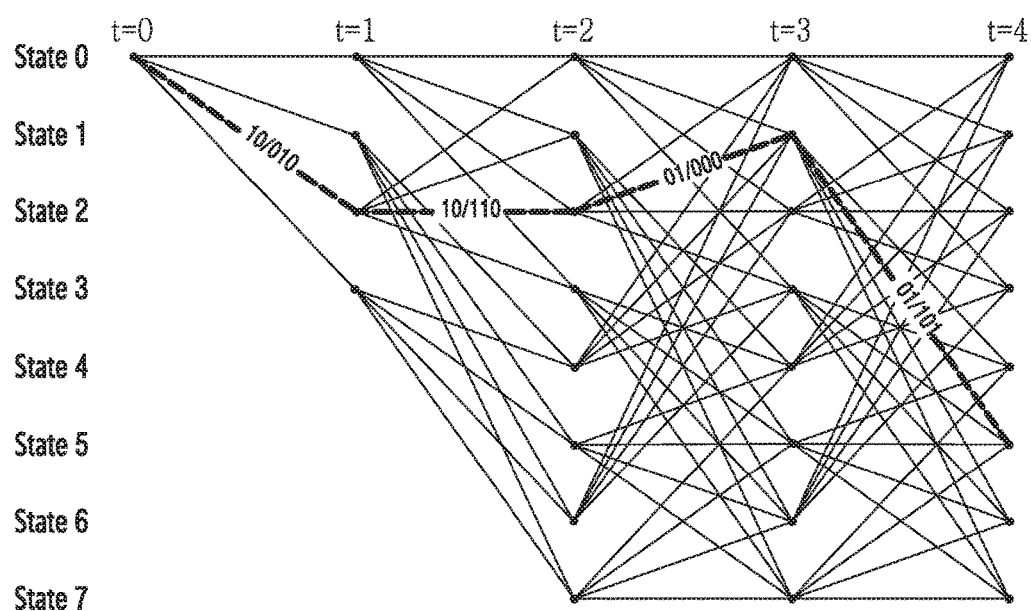
Figure 13B:
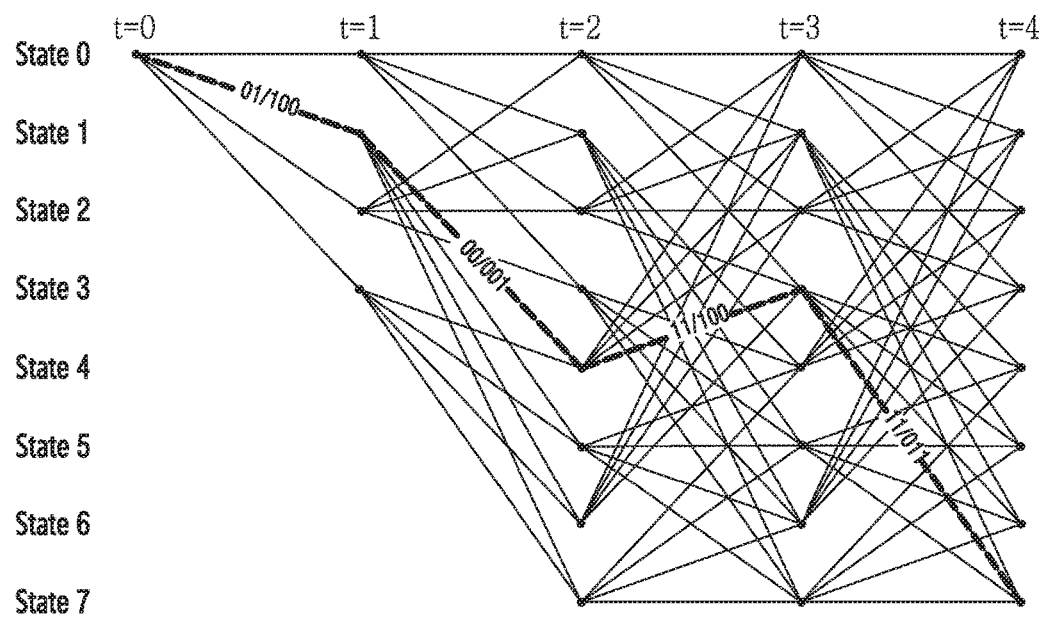

FIGS. 13A and 13B illustrate views showing a path search using a Viterbi algorithm when θ=0 and θ=π. In FIG. 13A, a path indicated by a dashed-line indicates a best path having a minimum path matric m(0)=4.8357. An input sequence of the best path is binary numerals [10, 10, 01, 01]. In FIG. 13B, a path indicated by a dashed-line indicates a best path having a minimum path matric m(π)=7.6345. An input sequence of the best path is binary numerals [01, 00, 11, 11]. Since m(0)<m(π) and $\theta_{opt}=0$, the best path is the path shown in FIG. 13A. Accordingly, the feedback sequence is $b_{opt}$=[10,10,01,01].

At the transmitter, $b_{opt}$=[10,10,01,01] is an input to the convolutional encoder shown in FIG. 11A, and a corresponding output sequence of the convolutional encoder is given as binary numerals [010, 110, 000, 101].

According to the mapping table shown in FIG. 11C, the output sequence corresponds to LTE codewords $W_1^{\{1\}}$, $W_3^{\{1\}}$, $W_0^{\{1\}}$, and $W_6^{\{1\}}$, and a channel vector which is quantized before being normalized, ĥ, is as shown in FIG. 12B.

As a result, the best codeword is represented by Equation 10 presented below:

$$c_{opt} = \frac{\hat{h}}{\|\hat{h}\|} \qquad \text{Equation 10}$$

The exemplary embodiments of the present disclosure as described above are applied to the 3GPP LTE 4Tx rank 1 codebook by way of an example, but the exemplary embodiments of the present disclosure may be equally applied to a higher rank.

In the case of a higher rank, the trellis-extended codebook (TEC) may be extended by mapping higher rank codewords onto the trellis output as shown in FIG. 10C or 11C. The TEC may maintain the orthogonal property of the codebook which is reused for the TEC. In the case of the higher rank, the nested property of the LTE codebook may be emulated using the same mapping regulation as shown in FIG. 10C or 11C. This mapping regulation is merely an example and other mapping regulations may be used.

Hereinafter, operations of quantizing a channel and feeding back the result of the quantizing according to another exemplary embodiment of the present disclosure will be explained with reference to FIGS. 14 to 19C. This exemplary embodiment relates to a trellis-extended successive phase adjustment (TE-SPA) scheme which adjusts a phase for the result of trellis-coded quantizing and feeds back information. The TE-SPA scheme may further enhance the performance by using a trellis structure for phase-adjusting a block of a quantized channel ĥ subsequent to the TEC scheme. The TE-SPA is similar to the W=W1W2 structure of the LTE-Advanced. The TEC and the TE-SPA may be regarded as long-term/wideband CSI and short-term/sub-band CSI, respectively.

Figure 14:
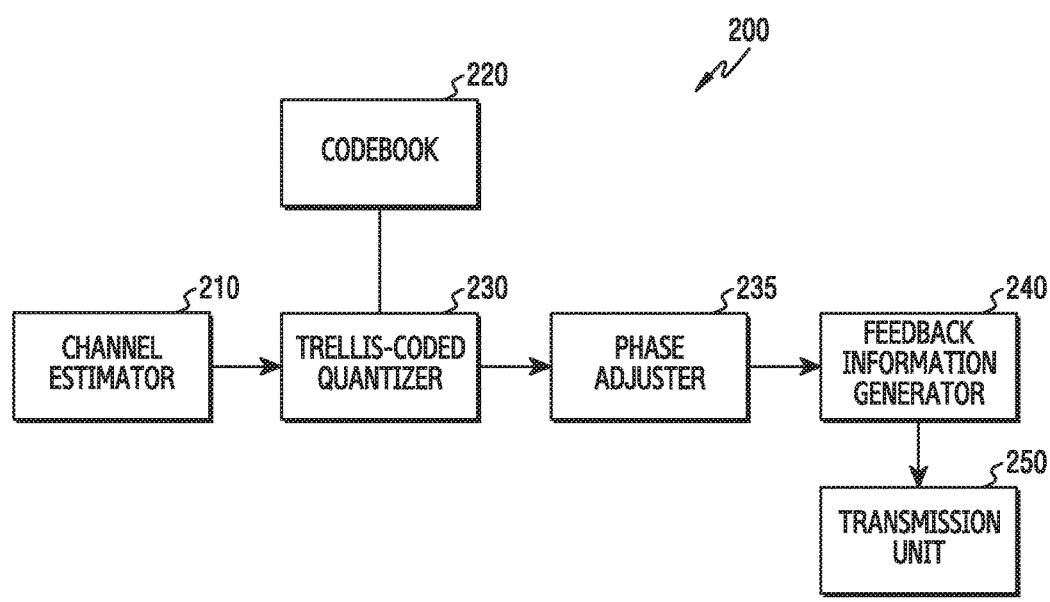
FIG. 14 illustrates a view showing a configuration of a receiver to be used in a MIMO communication system according to another exemplary embodiment of the present disclosure.

FIG. 14 illustrates a view showing a configuration of a receiver to be used in a MIMO communication system according to another exemplary embodiment. This configuration may be included in the receiver 200 shown in FIG. 1.

Referring to FIG. 14, the receiver 200 includes a channel estimator 210, a codebook 220, a trellis-coded quantizer 230, a phase adjuster 235, a feedback information generator 240, and a transmission unit 250. The channel estimator 210 receives a signal (for example, a pilot signal) transmitted from the transmitter 100 shown in FIG. 1, and estimates a reception channel. The codebook 220 stores a pre-defined codebook. For example, the codebook 220 stores the 3GPP LTE 4Tx codebook of the form shown in FIG. 9.

$W_n^{\{s\}}$ indicates a matrix which is defined by columns given by a set $\{s\}$ from an equation $W_n = I - 2u_n u_n^H / u_n^H u_n$. Herein, I is a 4×4 identity matrix and a vector $u_n$ is given as shown in FIG. 9. $C_{LTE,1}$ which is a 4Tx rank 1 codebook equals $C_{LTE,1} = \{W_k^{\{1\}}\}_{k=0}^{15}$.

The trellis-coded quantizer 230 trellis-coded quantizes reception channel information which is estimated by the channel estimator 210 using a codebook which is selected from a plurality of codebooks stored in the codebook 220. The phase adjuster 235 generates a phase-adjusted quantization result by adjusting the result of the quantizing by the quantizer 230 as much as a pre-defined phase. The feedback information generator 240 generates feedback information including the result of the quantizing by the trellis-coded quantizer 230. In addition, the feedback information generator 240 generates additional feedback information including the quantization result which has been phase-adjusted by the phase adjuster 235 after it had been quantized by the trellis-coded quantizer 230. The transmission unit 250 transmits the generated feedback information and/or the additional feedback information to the transmitter 100 shown in FIG. 1. The transmission unit 250 transmits the feedback information at first period intervals and transmits the additional feedback information at second period intervals. In one embodiment, the second period interval may be set to be shorter than the first period interval.

Figure 16:
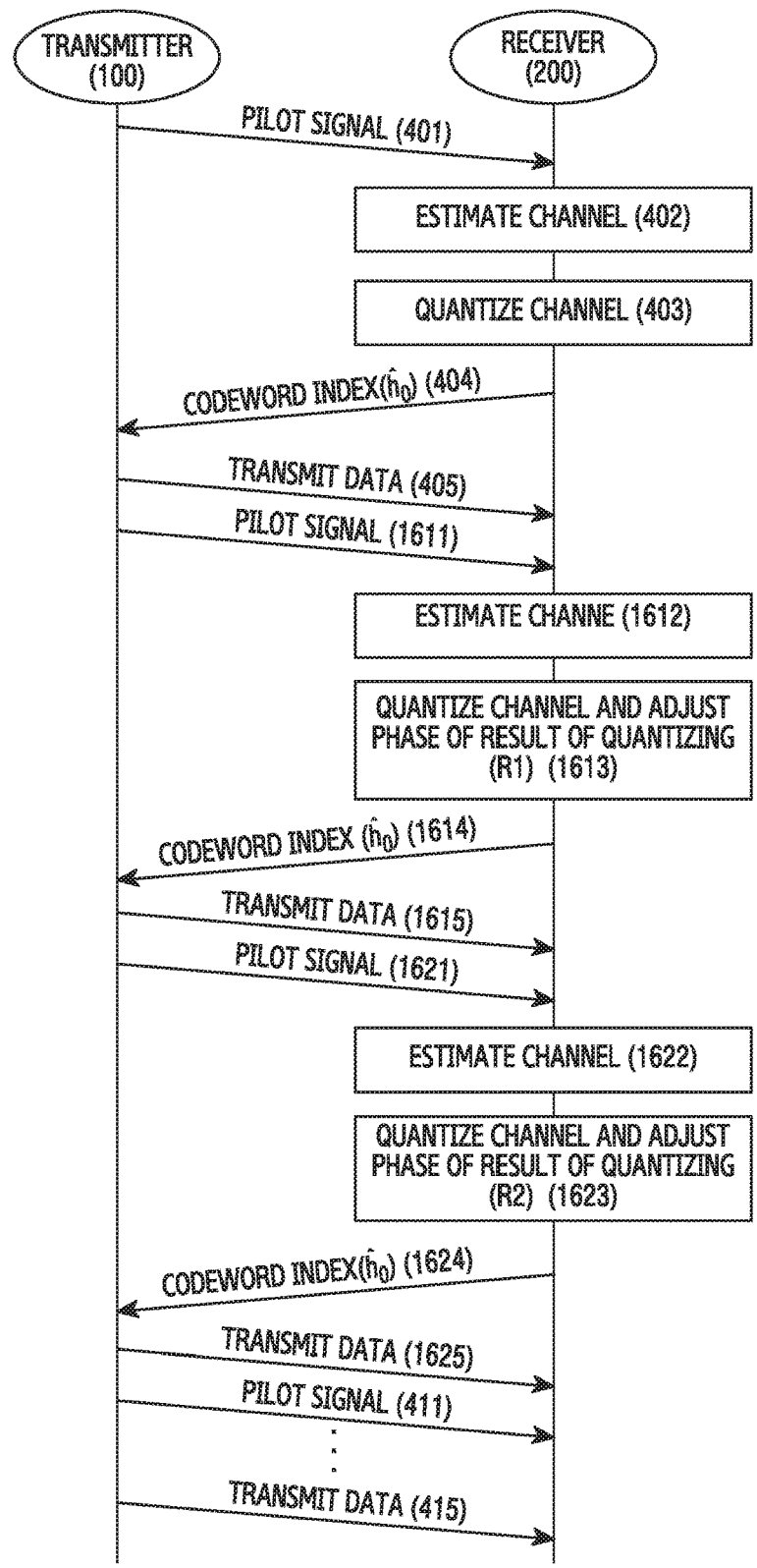
FIG. 16 illustrates a view showing operations of quantizing a channel and feeding back the result of the quantizing between the transmitter and the receiver in the MIMO communication system according to another exemplary embodiment of the present disclosure.

In one embodiment, the operation of generating the feedback information by the quantizer 230, the phase adjuster 235, the feedback information generator 240, and the transmission unit 250 may be performed in a method as shown in FIG. 16, which will be described below. That is, the feedback information including the result of the quantizing by the quantizer 230 is generated and transmitted at a first time, and then, the additional feedback information including the phase adjustment result for the result of the quantizing by the quantizer 230 is generated and transmitted at a second time and a third time.

Figure 15:
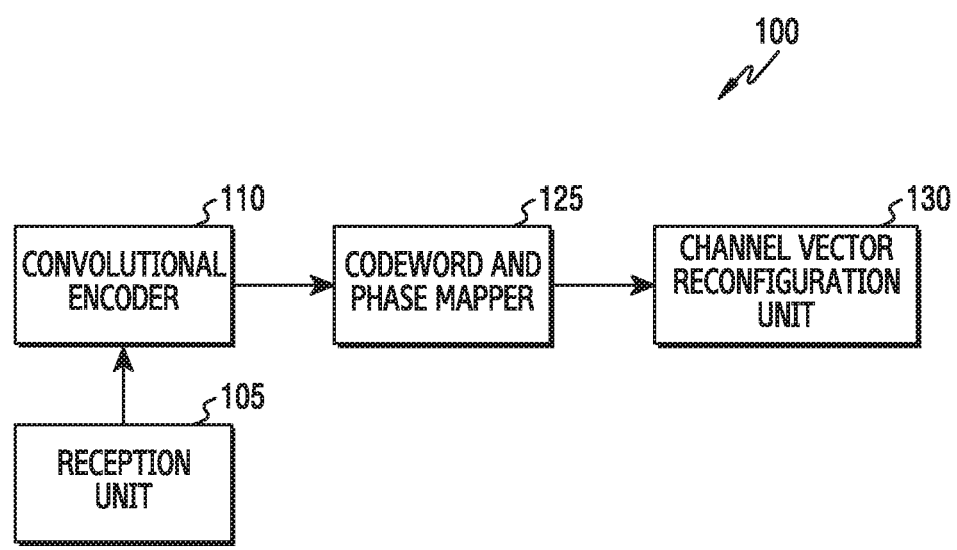
FIG. 15 illustrates a view showing a configuration of a transmitter to be used in a MIMO communication system according to another exemplary embodiment of the present disclosure.

FIG. 15 illustrates a view showing a configuration of a transmitter to be used in a MIMO communication system according to another exemplary embodiment of the present disclosure. This configuration may be included in the transmitter 100 shown in FIG. 1.

Referring to FIG. 15, the transmitter 100 includes a reception unit 105, a convolutional encoder 110, a codeword and phase mapper 125, and a channel vector reconfiguration unit 130. The reception unit 105 receives feedback information from the receiver 200 shown in FIG. 1. The feedback information includes the result of the trellis-coded quantizing. The feedback information is generated by trellis-coded quantizing, by the receiver 200, reception channel information using a codebook which is selected from a plurality of codebooks. The operation of trellis-coded quantizing includes an operation of truncating the reception channel information and codewords included in the selected codebook into a plurality of groups of channel vectors and a plurality of groups of codewords, and an operation of quantizing each of the groups of the channel vectors using each of the groups of the codewords.

The convolutional encoder 110 performs convolutional encoding for the feedback information. In one embodiment, the convolutional encoder includes one of a ¾ rate convolutional encoder, a ⅔ rate convolutional encoder, or a convolutional encoder having a certain rate. The codeword and phase mapper 125 maps the result of the convolution encoding (that is, a trellis output) onto codewords according to a pre-defined mapping regulation (for example, 10C, 11C). In addition, the codeword and phase mapper 125 maps the result of the convolution encoding (that is, a trellis output) onto phases according to a pre-defined mapping regulation (for example, FIG. 18, FIG. 19C). The channel vector reconfiguration unit 130 reconfigures a quantized channel vector according to the mapped codewords or phases.

FIG. 16 illustrates a view showing operations of quantizing a channel and feeding back the result of the quantizing between the transmitter and the receiver in the MIMO communication system according to another exemplary embodiment of the present disclosure.

Referring to FIG. 16, the transmitter 100 transmits a pilot signal and the receiver 200 receives the pilot signal transmitted from the transmitter 100 (401). The receiver 200 estimates a reception channel using the received pilot signal (402). The receiver 200 quantizes the received reception channel using a trellis-extended codebook (403). The receiver 200 feeds back a best codeword index $\hat{h}0$ (see the left drawing of FIG. 17) which is selected as the result of the quantizing to the transmitter 100 as feedback information (404). The transmitter 100 reconfigures a channel vector based on the information fed back from the receiver 200, and transmits data using the reconfigured channel vector (405).

Next, the transmitter 100 transmits a pilot signal and the receiver 200 receives the pilot signal transmitted from the transmitter 100 (1611). The receiver 200 estimates a reception channel using the received pilot signal (1612). The receiver 200 outputs a result of channel quantizing by rotating the best codeword index $\hat{h}0$ which has been previously transmitted using a phase adjustment matrix R1 (see the middle drawing of FIG. 17) (1613). The receiver 200 feeds back a codeword index $\hat{h}1=R1\hat{h}0$ which is the result of the quantizing to the transmitter 100 as additional feedback information (1614). The transmitter 100 reconfigures a channel vector based on the information fed back from the receiver 200, and transmits data using the reconfigured channel vector (1615).

Next, the transmitter 100 transmits a pilot signal and the receiver 200 receives the pilot signal transmitted from the transmitter 100 (1621). The receiver 200 estimates a reception channel using the received pilot signal (1622). The receiver 200 outputs a result of channel quantizing by rotating the best codeword index $\hat{h}1$ which has been previously transmitted using a phase adjustment matrix R2 (see the right drawing of FIG. 17) (1623). The receiver 200 feeds back a codeword index $\hat{h}2=R2\hat{h}1$ which is the result of the quantizing to the transmitter 100 as additional feedback information (1624). The transmitter 100 reconfigures a channel vector based on the information fed back from the receiver 200, and transmits data using the reconfigured channel vector (1625).

Herein, the receiver 200 feeds back the additional feedback information (subband/short-term feedback information) two times after feeding back the feedback information (wideband/long-term feedback information) one time, by way of an example. However, the receiver 200 may transmit the additional feedback information an appropriate number of times.

According to an exemplary embodiment of the present disclosure, when channel information as shown in FIG. 12A is provided, that is, when the number of transmission antennas of the transmitter M is 16 and the ⅔ rate convolutional encoder is used for trellis-coded quantization, feedback information which is transmitted during a long time may be implemented by 8 bits. On the other hand, since the TE-SPA requires only the phase adjustment information in comparison to the TEC, additional feedback information which is transmitted during a short time may be implemented by smaller bits (for example, four bits).

To simplify explanation, it will be assumed that the size of a block for phase adjustment equals the VQ codebook used for the TEC, but may be different.

Previously quantized CSI $\hat{h}_{k-1}$ is rotated by a block-wise phase adjustment matrix $R_k$ as shown in Equation 11 presented below:

$$R_k = \text{diag}([e^{j\varphi_{k,1}}, \ldots, e^{j\varphi_{k,M/L}}]^T \otimes 1_L \quad \text{Equation 11}$$

In Equation 11, ⊗ indicates a kronecker product, and $1_L$ indicates all 1 column vectors having a length of L.

Next, the currently quantized CSI $\hat{h}_k$ is represented by Equation 12 presented below:

$$\hat{h}_k = R_k \hat{h}_{k-1} \quad \text{Equation 12}$$

This trellis structure is used to calculate $\phi_k$ in $R_k$ for minimizing Equation 13 presented below using the Viterbi algorithm. This structure may be different from the trellis for the TEC.

$$\underset{R_k}{ar\min} \min_{\theta \in \Theta} \|h_k - e^{j\theta} R_k \hat{h}_{k-1}\|^2 \quad \text{Equation 13}$$

The first state transition experiences a limited number of branches as shown in FIGS. 13A and 13B. To reduce such a loss and further reduce a quantization error at each time, "block shifting" is applied before the trellis is optimized.

It is assumed that a(i→i+k) and A(i→i+k) are circular shifting of diagonal entries of a vector a and a matrix A having an element of k, respectively. For example, when a=[1, 2, 3, 4, 5, 6], a(i→i+2)=[3, 4, 5, 6, 1, 2].

Next, an optimization problem in Equation 13 may be rewritten as shown in Equation 14 presented below, and a quantized channel vector may be represented by Equation 15 presented below:

$$\underset{R_k}{ar\min} \quad \text{Equation 14}$$

$$\min_{\theta \in \Theta} \left\| h_k\left(i \to i + \frac{L}{2}(t-1)\right) - e^{j\theta} R_k \hat{h}_{k-1}\left(i \to i + \frac{L}{2}(t-1)\right) \right\|^2$$

$$\hat{h}_k = R_k\left(i \to i - \frac{L}{2}(t-1)\right)\hat{h}_{k-1} \quad \text{Equation 15}$$

The conceptual explanation of the TE-SPA having shifting is illustrated in FIG. 17. Referring to FIG. 17, a phase adjustment $e^{j\varphi k,1}$ from the first state transition at time k is multiplied by different blocks according to k. For example, the phase adjustment $e^{j\varphi k,1}$ at time k=0 is multiplied by a block of four codewords, first to fourth codewords, from the top of the channel vector, the phase adjustment $e^{j\varphi k,1}$ at time k=1 is multiplied by a block of four codewords, third to sixth codewords, from the top of the channel vector, and the phase adjustment $e^{j\varphi k,1}$ at time k=2 is multiplied by a block of four codewords, fifth to eighth codewords, from the top of the channel vector.

According to an exemplary embodiment of the present disclosure, there are proposed two different trellis structures according to whether the result of the channel entry quantization for the TE-SPA is ½ bit or ¼ bit.

FIG. 18 illustrates a view showing an example of implementation of a phase adjuster according to an exemplary embodiment of the present disclosure. FIG. 18 illustrates a case in which the result of the channel entry quantization for the TE-SPA is ½ bits. A convolutional encoder corresponding thereto is a ⅔ rate convolutional encoder as shown in FIG. 11A and a trellis structure corresponding thereto is as shown in FIG. 11B.

In the case of ½ bit per channel entry quantization, phases are allocated to the odd-numbered and even-numbered trellis outputs as shown in FIG. 18. The even-numbered trellis outputs 0, 2, 4, 6 are allocated to phase indexes 0, ⅜π, ⅘π, ⅝π, respectively. The odd-numbered trellis outputs 1, 3, 5, 7 are allocated to phase indexes ⅛ π, ⅜ π, ⅝ π, ⅞ π, respectively. FIG. 18 merely illustrates an example of mapping between phases and trellis outputs. Accordingly, mapping between phases and trellis outputs may be implemented in other forms.

Figure 19A:
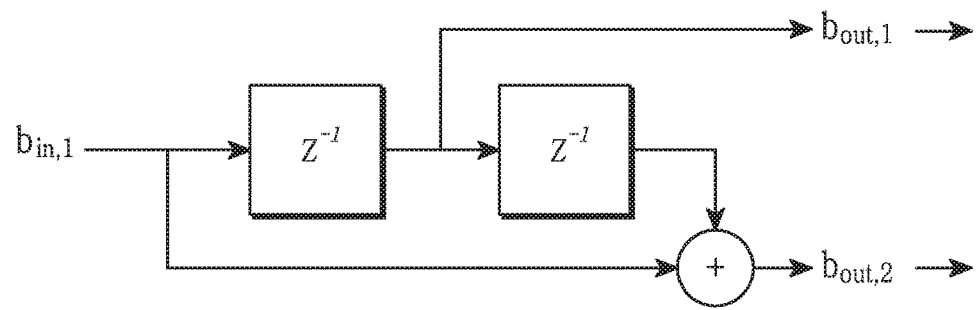
Figure 19B:
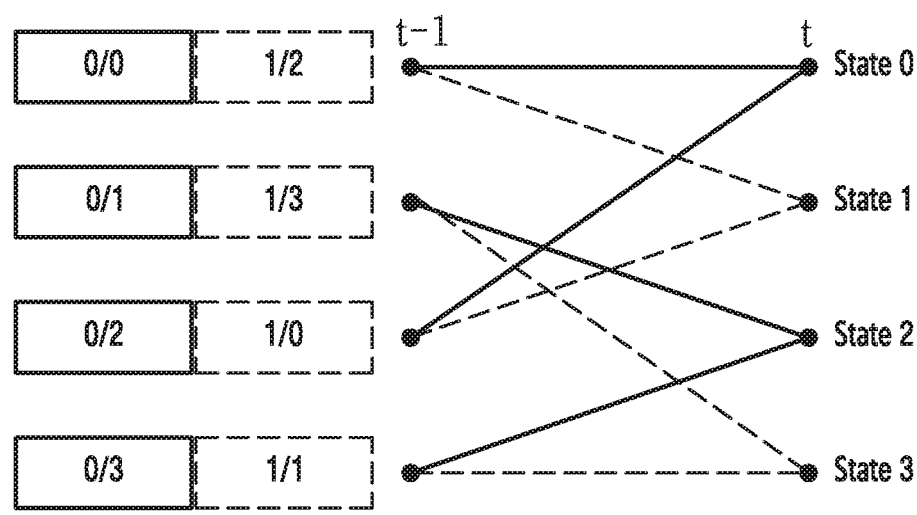

FIGS. 19A to 19C illustrate views showing another example of implementation of a phase adjuster according to an exemplary embodiment of the present disclosure. FIGS. 19A to 19C illustrate a case in which the result of the channel entry quantization for the TE-SPA is ¼ bit. A convolutional encoder corresponding thereto is a ½ rate convolutaional encoder as shown in FIG. 19A, and a trellis structure corresponding thereto is as shown in FIG. 19B.

In the case of ¼ bits per channel entry quantization, phases are allocated to the odd-numbered and even-numbered trellis outputs as shown in FIG. 19C. The even-numbered trellis outputs 0, 2 are allocated to phase indexes 0, ¾π, respectively. The odd-numbered trellis outputs 1, 3 are allocated phase indexes ¼ π, ¾ π, respectively. FIG. 19C merely illustrates an example of mapping between phases and trellis outputs. Accordingly, mapping between phases and trellis outputs may be implemented in other forms.

FIG. 20 illustrates a view showing a result of evaluating performance of a TEC according to an exemplary embodiment of the present disclosure.

Referring to FIG. 20, we compare the performance of TEC with a LTE-Advanced 8Tx codebook. Especially, we consider various antenna configurations such as Rayleigh fading, and spatial channel model (SCM) with 45/45 dual-polarized (DP) and uniform linear array (ULA) antenna settings. Although the LTE-Advanced 8Tx codebook consists with two codebooks, i.e., W1 and W2, we treat it as a 6 bits single codebook W=W1W2 for fair comparison. For TEC, we both compare ½ and ¾ bits per channel entry quantization cases. We set 5 bits for for TECs. The simulation results are summarized in FIG. 20.

Note that TEC gives better performance than LTE-Advanced codebook in Rayleigh fading channels. However, with practical settings in SCM channels, LTE-Advanced codebook is better than TEC. Especially, LTE-Advanced 8Tx codebook outperforms TEC when channels are highly correlated in both DP and ULA cases. The gap between the two becomes smaller as channels become uncorrelated.

Although LTE-Advanced 8Tx codebook gives better performance than TEC in 8Tx case with SCM channels, LTE-Advanced codebook cannot be extended to higher number of antenna cases while it is straight forward for TEC. Moreover, with planar antenna array case which would be the case for large-scale MIMO systems, LTE-Advanced codebook would perform poor because LTE-Advanced codebook is optimized for DP antenna scenarios.

Figure 21:
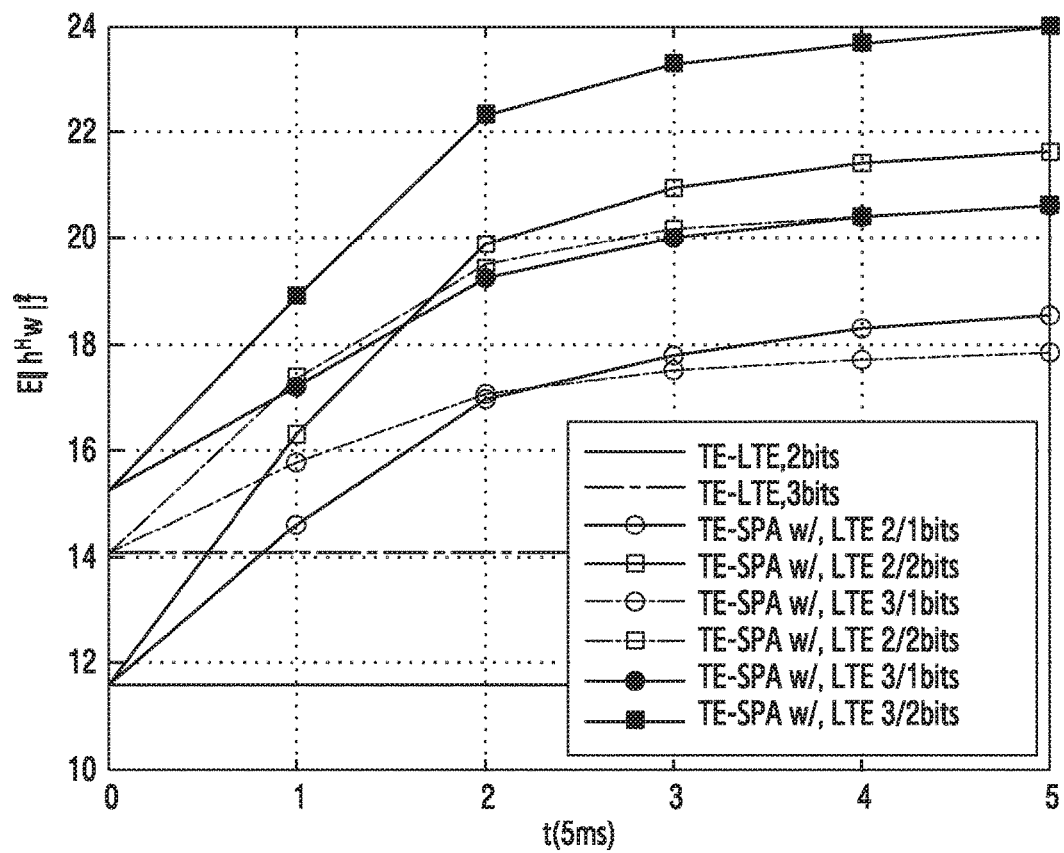

FIG. 21 illustrates a view showing a result of evaluating performance of the TE-SPA according to an exemplary embodiment of the present disclosure.

Referring to FIG. 21, we plot performance of TE-SPA with different base codebooks. 'TE-SPA w/LTE' and 'TE-SPA w/DFT' refer to the case of TEC with LTE 4Tx codebook and DFT codebook, respectively. For TE-SPA, a/b bits in the legend means that a bits are used for the original TEC at t=0 and b bits are used for TE-SPA from t=1.

It is obvious that TE-SPA improves performance significantly according to time. We only plot TE-SPA with 'shifting' because it gives much better performance than without shifting. Note that TE-DFT codebook gives better performance than TE-LTE codebook because DFT codebook is more suitable than LTE codebook for highly correlated channels.

As described above, the exemplary embodiments of the present disclosure provide a scheme for reducing feedback overhead when a receiver in a MIMO system quantizes channel state information and feeds back the channel state information to a transmitter. The exemplary embodiments of the present disclosure generate a trellis extended codebook (TEC) using a codebook, and uses the TEC in trellis-coded quantization. This quantization scheme truncates a channel vector and code vectors into a plurality of groups and quantizes the vectors, so that the number of bits of feedback information can be reduced in comparison with a case in which vectors are quantized without being truncated. In addition, the exemplary embodiments of the present disclosure include a trellis-extended successive phase adjustment (TE-SPA) scheme for adjusting a phase regarding the result of the trellis-coded quantizing. This scheme makes it possible to provide feedback information of a smaller number of bits during a short time.

Although the present disclosure has been described with reference to limited exemplary embodiments and drawings, the present disclosure is not limited to the above-described exemplary embodiments, and many modifications and changes can be made by those skilled in the art from the above descriptions. The operations according to the exemplary embodiments of the present disclosure may be implemented by a single processor. In this case, program commands for performing the operations implemented by various computers may be recorded on a computer-readable medium. The computer-readable medium may include program commands, data files, and data structures either alone or in combination. The program commands may be those that are especially designed and configured for the present disclosure, or may be those that are publicly known and available to those skilled in the art. Examples of the computer-readable recording medium include magnetic recording media such as hard disks, floppy disks and magnetic tapes, optical recording media such as CD-ROMs and DVDs, magneto-optical recording media such as floptical disks, and hardware devices such as ROMs, RAMs and flash memories that are especially configured to store and execute program commands. Examples of the program commands include machine language codes created by a compiler, and high-level language codes that can be executed by a computer by using an interpreter. When all or some of base stations or relays described in the present disclosure is implemented by a computer program, a computer-readable recording medium storing the computer program is also included in the present disclosure. Therefore, the scope of the invention is defined not by the detailed description of the invention but by the appended claims and equivalents to the claims.

What is claimed is:

1. A method for operating of a receiver in a multiple input multiple output (MIMO) system, the method comprising:
   trellis-coded quantizing channel information using a codebook selected from a plurality of codebooks; and
   transmitting, to a transmitter, feedback information comprising a result of the quantizing; and
   wherein the trellis-coded quantizing the channel information comprises, truncating the channel information into a plurality of groups of channel vectors, and trellis-coded quantizing each of the groups of the channel vectors using codewords in the codebook.

2. The method of claim 1,
   wherein the trellis-coded quantizing of the channel information comprises truncating the channel information into M/L groups of the channel vectors, and wherein M is a number of transmission antennas of the transmitter, and L is a predetermined number.

3. The method of claim 1, wherein the trellis-coded quantizing of the channel information comprises:
   allocating the codewords to outputs from a trellis structure corresponding to a pre-defined convolutional encoder;
   searching a path for the trellis structure; and
   outputting information indicating a best codeword corresponding to a best path as a result of the searching of the path as the result of the quantizing corresponding to the groups of the channel vectors.

4. The method of claim 3, wherein the searching of the path comprises searching the path for the trellis structure in a pre-defined search range of an entire search range.

5. The method of claim 3, wherein the allocating of the codewords to the outputs from the trellis structure corresponding to the pre-defined convolutional encoder comprises, allocating the codewords to the outputs from the trellis structure such that a minimum Euclidean distance between codewords allocated to an odd-numbered output and an even-numbered output from the trellis structure is maximized.

6. The method of claim 3, wherein the pre-defined convolutional encoder comprises one of a ¾ rate convolutional encoder, a ⅔ rate convolutional encoder, or a convolutional encoder having a certain rate.

7. The method of claim 1, wherein the channel information comprises a result of channel-estimating received pilot signals.

8. The method of claim 1, further comprising transmitting, to the transmitter, additional feedback information which comprises a phase-adjusted quantization result which is generated by adjusting the result of the quantizing as much as a pre-defined phase.

9. The method of claim 8,
   wherein the feedback information is transmitted at first period intervals, and
   wherein the additional feedback information is transmitted at second period intervals which are shorter than the first period intervals.

10. A method for operating of a transmitter in a multiple input multiple output (MIMO) system, the method comprising:
    receiving, from a receiver, feedback information comprising a result of trellis-coded quantizing;
    performing convolutional encoding for the feedback information;
    mapping a result of the convolutional encoding onto codewords according to a pre-defined mapping regulation; and
    reconfiguring a quantized channel vector according to the mapped codewords.

11. The apparatus of claim 10,
    wherein the feedback information is generated by trellis-coded quantizing, by the receiver, channel information using a codebook selected from a plurality of codebooks, and
    wherein the trellis-coded quantizing comprises, truncating the channel information into a plurality of groups of channel vectors, and trellis-coded quantizing each of the groups of the channel vectors using codewords in the codebook.

12. A receiver in a multiple input multiple output (MIMO) system, the receiver comprising:
- at least one processor configured to:
  - trellis-coded quantize channel information using a codebook selected from a plurality of codebooks, and
  - generate feedback information including a result of the quantizing; and
- a transceiver configured to transmit the feedback information to a transmitter,
- wherein the trellis-coded quantizer is configured to truncate the channel information into a plurality of groups of channel vectors, and trellis-coded quantize each of the groups of the channel vectors using codewords in the codebook.

13. The apparatus of claim 12,
- wherein the at least one processor is further configured to truncate the channel information into M/L groups of the channel vectors, and
- wherein M is a number of transmission antennas of the transmitter and L is a predetermined number.

14. The apparatus of claim 12, wherein the at least one processor is further configured to allocate the codewords to outputs from a trellis structure corresponding to a pre-defined convolutional encoder, search a path for the trellis structure, and output information indicating a best codeword corresponding to a best path as a result of the searching the path as the result of the quantizing corresponding to the groups of the channel vectors.

15. The apparatus of claim 14, wherein the at least one processor is further configured to search the path for the trellis structure in a pre-defined search range of an entire search range.

16. The apparatus of claim 14, wherein the at least one processor is further configured to allocate the codewords to the outputs from the trellis structure such that a minimum Euclidean distance between codewords allocated to an odd-numbered output and an even-numbered output from the trellis structure is maximized.

17. The apparatus of claim 14, wherein the convolutional encoder comprises one of a ¾ rate convolutional encoder, a ⅔ rate convolutional encoder, or a convolutional encoder having a certain rate.

18. The apparatus of claim 12, wherein the channel information comprises a result of channel-estimating received pilot signals.

19. The apparatus of claim 12, wherein the transceiver is further configured to transmit, to the transmitter, additional feedback information which comprises a phase-adjusted quantization result which is generated by adjusting the result of the quantizing as much as a pre-defined phase.

20. The apparatus of claim 19,
- wherein the feedback information is transmitted at first period intervals, and
- wherein the additional feedback information is transmitted at second period intervals which are shorter than the first period intervals.

* * * * *